(12) United States Patent
Rezvani et al.

(10) Patent No.: US 7,555,528 B2
(45) Date of Patent: Jun. 30, 2009

(54) SYSTEMS AND METHODS FOR VIRTUALLY REPRESENTING DEVICES AT REMOTE SITES

(75) Inventors: Babak Rezvani, New York, NY (US); Jack L. Chen, Astoria, NY (US); Edward B. Kalin, Easton, CT (US); Reza Jalili, Bronxville, NY (US)

(73) Assignee: Xanboo Inc., New York, NY (US)

( * ) Notice: Subject to any disclaimer, the term of this patent is extended or adjusted under 35 U.S.C. 154(b) by 372 days.

(21) Appl. No.: 09/887,982

(22) Filed: Jun. 22, 2001

(65) Prior Publication Data
US 2003/0140107 A1  Jul. 24, 2003

Related U.S. Application Data

(60) Provisional application No. 60/266,207, filed on Feb. 2, 2001, provisional application No. 60/250,034, filed on Nov. 29, 2000, provisional application No. 60/247,183, filed on Nov. 10, 2000, provisional application No. 60/230,305, filed on Sep. 6, 2000.

(51) Int. Cl.
*G06F 15/16* (2006.01)

(52) U.S. Cl. .................. 709/217; 709/208; 709/219; 709/223; 709/224; 345/473; 345/530

(58) Field of Classification Search .................. 709/208, 709/223, 226, 220, 224, 217, 219; 345/700, 345/706, 733, 736, 738, 740, 778, 169, 473, 345/530; 340/506; 715/513, 740, 500.1
See application file for complete search history.

(56) References Cited

U.S. PATENT DOCUMENTS

| | | | |
|---|---|---|---|
| 3,812,462 A | 5/1974 | Crossland et al. | 340/163 |
| 4,977,612 A | 12/1990 | Wilson | 455/166 |
| 4,990,890 A | 2/1991 | Newby | 340/539 |
| 5,291,193 A | 3/1994 | Isobe et al. | 340/825.69 |
| 5,574,965 A | 11/1996 | Welmer | 455/3.2 |
| 5,689,442 A | 11/1997 | Swanson et al. | 364/550 |
| 5,754,765 A | 5/1998 | Danneels et al. | 395/200.1 |
| 5,802,467 A | 9/1998 | Salazar et al. | 455/420 |
| 5,812,394 A | 9/1998 | Lewis et al. | |
| 5,815,086 A | 9/1998 | Ivie et al. | 340/825.52 |
| 5,817,993 A | 10/1998 | Kamani et al. | 187/316 |
| 5,818,845 A | 10/1998 | Moura et al. | 370/449 |
| 5,829,444 A | 11/1998 | Ferre et al. | 128/897 |
| 5,859,852 A | 1/1999 | Moura et al. | 370/449 |
| 5,872,928 A | 2/1999 | Lewis et al. | 395/200.52 |
| 5,898,386 A | 4/1999 | Kaihatsu | 340/825.69 |
| 5,963,624 A | 10/1999 | Pope | 379/110.01 |
| 6,005,476 A | 12/1999 | Valiulis | 340/310.01 |
| 6,005,482 A | 12/1999 | Moran et al. | 340/568.8 |

(Continued)

OTHER PUBLICATIONS

Office Action issued in U.S. Appl. No. 09/709,688 on Dec. 3, 2002 and Applicant's Response.

(Continued)

*Primary Examiner*—Thu Ha T Nguyen

(57) ABSTRACT

Methods and systems for virtually representing devices at remote sites are provided. Such methods may include registering information associated with a device, generating a virtual representation of the device on a remote user access device, and commanding the device to perform an action.

18 Claims, 26 Drawing Sheets

U.S. PATENT DOCUMENTS

| | | | | |
|---|---|---|---|---|
| 6,009,401 | A | 12/1999 | Horstmann | 705/1 |
| 6,012,084 | A | 1/2000 | Fielding et al. | 709/205 |
| 6,020,881 | A * | 2/2000 | Naughton et al. | 715/740 |
| 6,032,202 | A | 2/2000 | Lea et al. | 710/8 |
| 6,035,323 | A | 3/2000 | Narayen et al. | 709/201 |
| 6,061,738 | A | 5/2000 | Osaku et al. | 709/245 |
| 6,098,116 | A | 8/2000 | Nixon et al. | 710/8 |
| 6,134,606 | A | 10/2000 | Anderson et al. | 710/14 |
| 6,147,601 | A * | 11/2000 | Sandelman et al. | 340/506 |
| 6,163,316 | A | 12/2000 | Killian | 345/327 |
| 6,182,094 | B1 * | 1/2001 | Humpleman et al. | 715/513 |
| 6,198,408 | B1 | 3/2001 | Cohen | 340/825.69 |
| 6,202,210 | B1 | 3/2001 | Ludtke | 725/20 |
| 6,212,556 | B1 | 4/2001 | Arunachalam | 709/219 |
| 6,218,953 | B1 | 4/2001 | Petite | 340/641 |
| 6,219,702 | B1 | 4/2001 | Ikehara et al. | 709/224 |
| 6,236,997 | B1 | 5/2001 | Bodamer et al. | 707/10 |
| 6,237,049 | B1 | 5/2001 | Ludtke | 710/8 |
| 6,243,000 | B1 | 6/2001 | Tsui | 340/5.21 |
| 6,275,490 | B1 | 8/2001 | Mattaway et al. | 370/352 |
| 6,275,939 | B1 | 8/2001 | Garrison | 713/200 |
| 6,286,038 | B1 | 9/2001 | Reichmeyer et al. | 709/220 |
| 6,288,716 | B1 * | 9/2001 | Humpleman et al. | 345/733 |
| 6,292,830 | B1 | 9/2001 | Taylor et al. | 709/224 |
| 6,298,332 | B1 | 10/2001 | Montague | 705/27 |
| 6,311,197 | B2 | 10/2001 | Mighdoll et al. | 707/513 |
| 6,330,597 | B2 * | 12/2001 | Collin et al. | 709/220 |
| 6,680,730 | B1 * | 1/2004 | Shields et al. | 345/169 |
| 6,710,790 | B1 * | 3/2004 | Fagioli | 715/802 |
| 6,954,859 | B1 | 10/2005 | Simerly et al. | |
| 7,231,592 | B2 | 6/2007 | Humpleman et al. | 715/500.1 |
| 2002/0058499 | A1 * | 5/2002 | Ortiz | 455/412 |
| 2002/0169914 | A1 * | 11/2002 | Shteyn | 710/305 |
| 2003/0234809 | A1 * | 12/2003 | Parker et al. | 345/740 |
| 2004/0150546 | A1 * | 8/2004 | Choi | 341/176 |

OTHER PUBLICATIONS

Office Action issued in U.S. Appl. No. 09/709,688 on Jun. 19, 2002 and Applicant's Response.

Office Action issued in 09709,688 on Dec. 20, 2001 and Applicant's Response.

Office Action issued in U.S. Appl. No. 10/664,609 on Sep. 13, 2004 and Applicant's Response.

Office Action issued in U.S. Appl. No. 11/143,920 on Nov. 1, 2006 and Applicant's Response.

Office Action issued in U.S. Appl. No. 09/887,982 on Sep. 14, 2004 and Applicant's Response.

Office Action issued in U.S. Appl. No. 09/887,982 on Jun. 21, 2005 and Applicant's Response.

Office Action issued in U.S. Appl. No. 09/887,982 on Apr. 6, 2006 and Applicant's Response.

Office Action issued in U.S. Appl. No. 09/887,982 on Jan. 16, 2007 and Applicant's Response.

Office Action issued in U.S. Appl. No. 09/887,982 on Jan. 18, 2008 and Applicant's Response.

Office Action issued in U.S. Appl. No. 09/711,369 on Aug. 1, 2003.

Office Action issued in U.S. Appl. No. 09/711,369 on Nov. 17, 2003 and Applicant's Response.

Office Action issued in U.S. Appl. No. 09/711,369 on Apr. 9, 2004 and Applicant's Response.

Office Action issued in U.S. Appl. No. 09/711,369 on Mar. 4, 2005 and Applicant's Response.

Office Action issued in U.S. Appl. No. 09/711,369 on Nov. 16, 2005 and Applicant's Response.

Office Action issued in U.S. Appl. No. 09/711,369 on Jul 28, 2006 and Applicant's Response.

Office Action issued in U.S. Appl. No. 09/775,882 on Apr. 14, 2005.

Office Actioin issued in U.S. Appl. No. 09/775,882 on Oct. 11, 2006 and Applicant's Response.

Office Action issued in U.S. Appl. No. 09/775,882 on Jun. 7, 2004 and Applicant's Response.

Office Action issued in U.S. Appl. No. 09/775,882 on Feb. 15, 2006 and Applicant's Response.

Office Action issued in U.S. Appl. No. 09/775,882 on Apr. 15, 2005 and Applicant's Response.

Office Action issued in U.S. Appl. No. 09/775,882 on Jun. 7, 2007 and Applicant's Response.

\* cited by examiner

| Command Name | Command Parameters | Command Validity Checks |
|---|---|---|
| NewAccount | 1. userId<br>2. password | UserId is unique. Password must contain only valid characters. New applianceGUID must be unique. |
| AddXMMonitoring Module | 1. userId<br>2. password | UserId and password must be current registered user. New Monitoring ModuleGUID must be unique. |
| addUser | 1. userId<br>2. password | UserId is unique. Password must contain only valid characters. |
| AddAppliance | 1. name<br>2. class<br>3. description<br>4. port | Appliance description unique to this installation. |
| AddApplianceAction | 1. applianceName<br>2. actionName<br>3. label<br>4. description<br>5. order<br>6. group | ApplianceName appliance already registered for this installation. applianceAction description & label unique within this installation. |
| AddApplianceIndicator | 1. applianceName<br>2. indicatorName<br>3. label<br>4. type<br>5. order<br>6. group | ApplianceName appliance already registered for this installation. indicatorName & label unique within this installation. |
| AddMonitoringModuleEvents | 1. name<br>2. description | Event description unique within this installation. |

FIG. 13a

SIGN-UP SERVICE AGREEMENT

[ I AGREE ]   [ I DISAGREE ]

This Services Agreement ("Agreement") is between you ("User") and CORE Technology, Inc. ("Company"). In consideration of the right to access and use the Company's website, http://www.xanboo.com ("Website"), and receive services offered through the Website (the "Services"), User agrees to the terms and conditions of use set forth in this Agreement and acknowledges that he she is at least 18 years of age. User's continued use of the Services indicates User's willingness to be legally bound by the terms and conditions of this Agreement as set forth below. This Agreement applies to the Services currently offered by the Company and any Services that the Company may choose to offer in the future (unless stated otherwise).

1. Covenant to Read Agreement.
User acknowledges that User has read this Agreement and accepts the terms thereof. If User does not agree to these terms and conditions, User may not access or otherwise use the Website or the Services.

2. Company's Control Over Website.
(a) Company has the right, but no the obligation, to monitor the use of the Website and the Services, and, except as otherwise provided under Company's Privacy Policy, may freely use and disclose any information and materials received from the User or collected through User's use of the Website for any lawful reason or purpose. Click here to view Company's Privacy Policy. Without limiting the foregoing, Company has the right to remove any material that Company, in its sole discretion, finds to be in violation of the provisions hereof or

FIG. 16

SIGN-UP SERVICE AGREEMENT

- *First Name:
- *Last Name:
- Street Address:
- City:
- State/Province: [Choose a State]
- Zip Code:
- Country: [Choose a Country]
- Home Phone:
- *E-mail:
- *Verify E-mail:
- *Choose User Name:
- *Choose Password:
- *Verify Password:
- *Where did you purchase your Xanboo system: [Choose Retail Outlet]

[BACK] [CLEAR FORM] [SUBMIT]

FIG. 17 bigi's account    logout

| message board | groups | shoeboxes | control panel |

(back to list)

Home Control AUTO CONTROL

EVENT DESCRIPTION                     NOTIFICATION

| Capture video button was pressed | No notifications set up | (edit action) |
| Capture Image button was pressed | No notifications set up | (edit action) |
| Temperature | No notifications set up | (edit action) |
| Contact | E-mail: 8883333333@message.bam.com | (edit action) |
| Water | No notifications set up | (edit action) |
|  | No notifications set up | (edit action) |
| Acoustic | No notifications set up | (edit action) |
| Printer motion detector | No notifications set up | (edit action) |
| Office Door motion detector | No notifications set up | (edit action) |
| Front Wall motion detector | No notifications set up | (edit action) |

View or Edit Appliance

FIG. 18

Introduction to Detecting Cameras
Please make sure that you have connected one or more cameras to your System Controller. Then click "next" to continue with setup You may attach from one to four 'wired' video cameras to your System Controller. If you have not already connected at least one camera, please do so at this time, then click on the 'next' button.

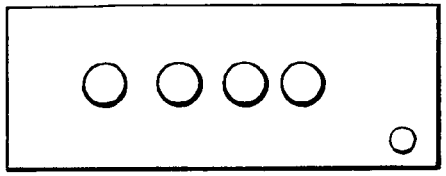

To connect a camera, insert the yellow plug on the end of the camera cable into one of the yellow camera jacks (labeled 'CAM1' through 'CAM4') located on the back panel of the System Controller.

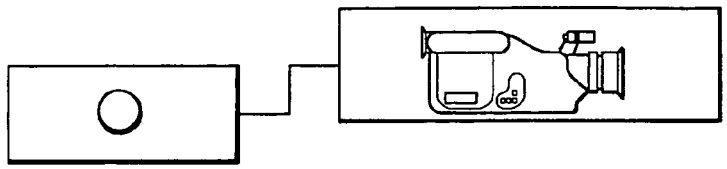

On the following Setup screen, Home Control will detect and configure the camera(s) that you have connected. You may choose a custom name for each camera, or accept the default names of 'Camera 1' through 'Camera 1'.

( exit wizard )   1 [2] 3 4 5 6 7 8   ◀ previous   next ▶

FIG. 21

Configure your Internet connection
Tell Home Control about your Internet connection.

1. Tell about the Internet connection used by this computer.
   My Internet connection is (choose one):
   - ⊙ Always on   (via cable modem, DSL, LAN)
   - ○ Dial-up     (via telephone modem)

→ 2. Click on the 'test connection' button to check your Internet connection.

( test connection )

( exit wizard )     1 2 3 [4] 5 6 7 8     ◁ previous

FIG. 23

SYSTEMS AND METHODS FOR VIRTUALLY REPRESENTING DEVICES AT REMOTE SITES

This application claims the benefit of Rezvani et al. U.S. Provisional Patent Application Ser. No. 60/230,305, filed Sep. 6, 2000, Rezvani et al. U.S. Provisional Patent Application Ser. No. 60/247,183, filed Nov. 10, 2000, Rezvani et al. U.S. Provisional Patent Application Ser. No. 60/250,034, filed Nov. 29, 2000, and Rezvani et al. U.S. Provisional Patent Application Ser. No. 60/266,207, filed Feb. 2, 2001.

BACKGROUND OF THE INVENTION

This invention relates to systems and methods for virtually representing devices at remote sites.

Today, software applications exist that allow users to directly control devices using on-screen representations of the devices. In one common application for personal computers for example, users directly control a compact disc (CD) player to play, stop, rewind and fast-forward CDs using a graphical representation of the controls of a CD-ROM player. It may be desirable, however, to control a device from a remote location. Accordingly, a need exists for a system that will allow a device to be controlled by a remote user through a virtual representation of the device.

SUMMARY OF THE INVENTION

In accordance with principles of the present invention, systems and methods for virtually representing and controlling remote devices are provided. Various features in accordance with various embodiments of the present invention are described, for example in Rezvani et al. U.S. provisional patent application Ser. No. 60/230,305, filed Sep. 6, 2000, Rezvani et al. U.S. provisional patent application Ser. No. 60/247,183, filed Nov. 10, 2000, Rezvani et al. U.S. provisional patent application Ser. No. 60/250,034, filed Nov. 29, 2000, and Rezvani et al. U.S. provisional patent application Ser. No. 60/266,207, filed Feb. 2, 2001, which are hereby incorporated by reference herein in their entireties.

In some embodiments, remote devices may be represented by parameters, actions, and indicators. Parameters, actions, and indicators may be text strings that describe or represent various aspects of a remote device. For example, a parameter may be a text string indicating the name, description, type, or manufacturer of a device. An action may be a selectable text string representing one of the various actions that a remote device may take. The text string for an action may be associated with one or more commands for a device, which may be transmitted to the device when a user selects the action. An indicator may be a text string indicating the status of an aspect of a remote device.

The parameters, actions, and indicators associated with a device may be arranged and presented to a user in any suitable manner. In some embodiments, parameters and indicators may be presented to a user as text strings on a web page. Actions may be presented to a user as, for example, selectable links on the web page. A user may command a remote device to perform an action by 'clicking' the desired action link.

In some embodiments, remote devices may be virtually represented by resources and components. Resources and components may be graphical representations of the physical resources and components of a remote device ("members"), and may be graphically similar to the resources and components that they represent. A template document may be used to specify how resources and components may be arranged and presented to a user.

In some embodiments, a combination of actions, indicators, resources, or components may be used. For example, a component may be labeled with or contain an indicator.

In some embodiments, virtual representations of devices may be registered. For example, a web server may generate data to be used in generating a virtual representation of a device from data supplied by a database server. This data may include instructions on how to generate or render a resource or component.

Further features of the invention, its nature and various advantages will be more apparent from the accompanying drawings and the following detailed description of the preferred embodiments.

BRIEF DESCRIPTION OF THE DRAWINGS

FIG. 13*a* is a table of illustrative commands, their parameters, and validity checks in accordance with an embodiment of the present invention.

FIG. 16 shows an illustrative registration display screen for a service agreement in accordance with an embodiment of the present invention.

FIG. 17 shows an illustrative registration display screen for requesting information from a user in accordance with an embodiment of the present invention.

FIG. 18 shows an illustrative registration display screen that displays a listing of event descriptions and the corresponding notifications set up for each even description listing in accordance with an embodiment of the present invention.

FIG. 21 shows an illustrative registration display screen for instructing the user on how to attach devices to a monitoring module in accordance with an embodiment of the present invention.

FIG. 23 shows an illustrative registration display screen that allows the user to provide information communications network being used and to test a connection in accordance with an embodiment of the present invention.

DETAILED DESCRIPTION OF EMBODIMENTS OF THE INVENTION

Figure 1:
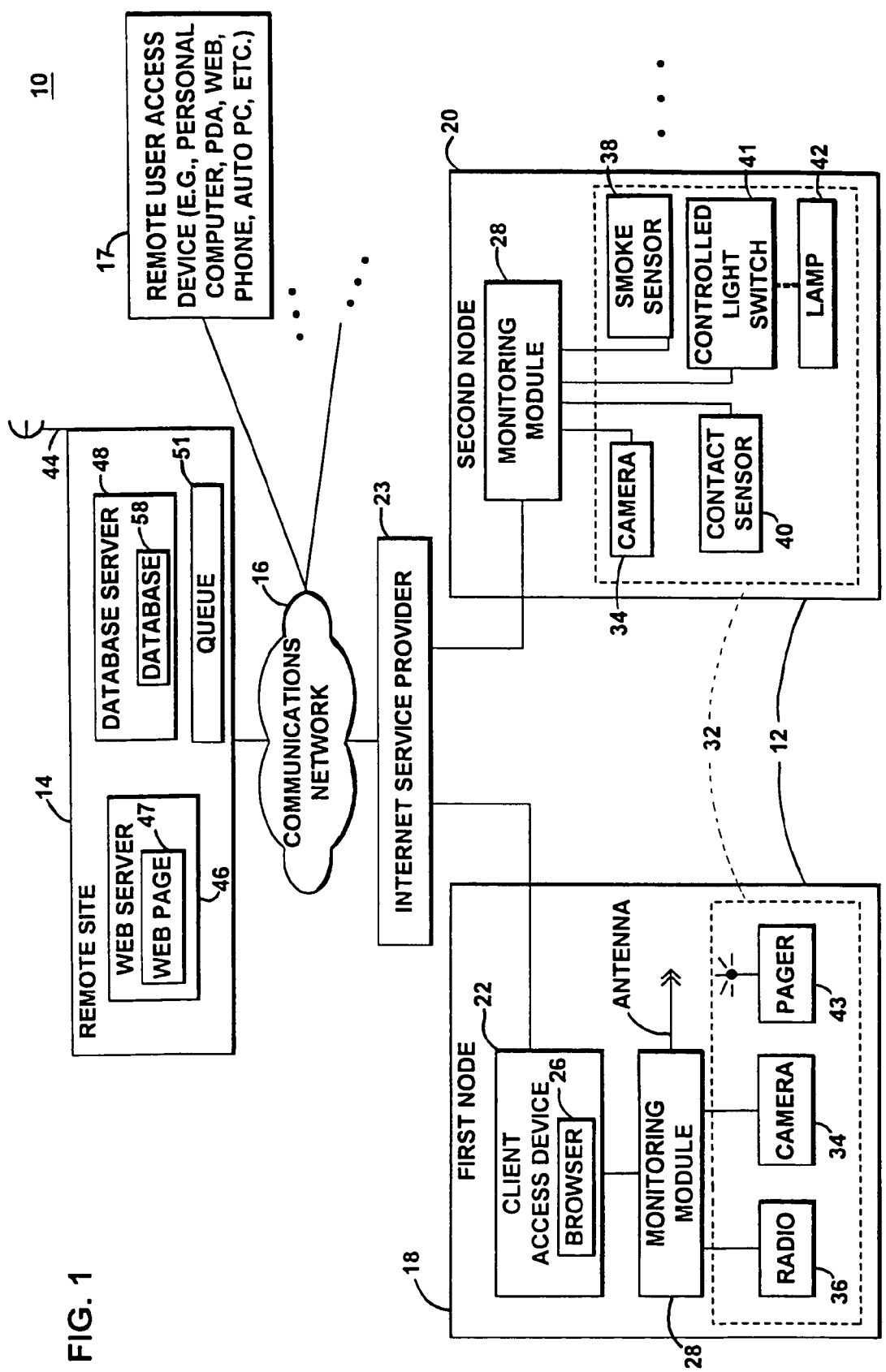
FIG. 1 is a block diagram of an illustrative system in accordance with an embodiment of the present invention.

FIG. 1 shows an illustrative system 10 in accordance with an embodiment of the present invention. For purposes of clarity, and not by way of limitation, an illustrative client-server Internet based embodiment of the present invention is herein described, but any suitable peer-to-peer or other distributed approach may be used. For example, one computer may have software that enables the computer to act as both a web server and as a database server. System 10 may include an installation 12 and a remote site 14 that may be linked via a communications network 16. In practice, there may be more than one remote site 14 and installation 12, but only one each is shown to avoid over-complicating the drawing. As herein used, the term "server" is not limited to a distinct piece of computing hardware or storage hardware, but may also be a software application or a combination of hardware and software.

Remote site 14 may be any suitable remote site, and may include various equipment, such as one or more servers, mainframes, personal computers, or any other suitable computer-based equipment. Remote site 14 may include a network of suitable computers that may be interconnected in any suitable way. For example, these computers may be interconnected through a local area network, wide area network, telephone network, cable television network, intranet, Internet, or any other suitable wired or wireless communications network.

Communications network 16 may be any suitable communications network. For example, communications network 16 may be a local area network, wide area network, telephone network, cable television network, intranet, Internet, or any other suitable wired or wireless communications network. Some suitable wireless communications standards that may be used to implement communications network 16 may include global system for mobile communications (GSM), time-division multiple access (TDMA), code-division multiple access (CDMA), Bluetooth, or any other suitable wireless communication standards.

Installation 12 and remote site 14 may communicate over communications network 16 using any suitable protocol or protocol stack. For example, installation 12 and remote site 14 may communicate via the Transmission Control Protocol/Internet Protocol (TCP/IP) standard using, for example, IP version 4 or IP version 6 (both of which support 128-bit network addressing) and a hypertext transfer protocol (HTTP). In another approach, universal plug and play (UPnP) technology may be used to allow installation 12 and remote site 14 to communicate. Any suitable request-response type of protocol and socket-based packet transport stack, or suitable peer-to-peer communications approach may be used.

Installation 12 and remote site 14 may communicate using any suitable communications. Communications may include, for example, commands, requests, messages, remote procedure calls (e.g., using a proxy-stub pair), or any other suitable client-server or peer-to-peer communication. Communications may also involve, for example, complex communications between application constructs running on installation 12 and remote site 14. Objects running on the client and server may, for example, communicate using an Object Request Broker (ORB). Transmitted information may, for example, be encapsulated as COM objects or Javabeans and persisted to files that are transmitted over a remote access link. In another suitable approach, access communications may include hypertext markup language (HTML) formatted documents (e.g., web pages) that are exchanged between installation 12 and remote site 14 via ISP 23 and communications link 16.

As another example, communications may include a series of HTTP posts and responses in which the parameters for the transmissions may be sent as name/value pairs in the normal post method. In order to transmit multiple commands in a single command string, numbered commands may be parsed out and executed at remote site 14. Remote site 14 may be responsible for parsing the command string into individual commands and executing each of those commands. To parse commands, remote site 14 may utilize a script language and interpreter such as Personal Home Page Tools (PHP) that is embedded within a Web page along with its Hypertext Markup Language (HTML). For example, before a page is sent to the requesting user, web server 46 may call PHP to interpret and perform the operations called for. Other similar technologies may also be utilized such as JavaScript, Microsoft's VBScript, or any other applicable script interpreter. If desired, any other suitable client-server or peer-to-peer based approach may be used.

Installation 12 may be operated by a local user. Installation 12 may include one or more nodes. For purposes of clarity, and not by way of limitation, FIG. 1 illustrates an approach having two nodes, first user node 18 and second user node 20. It should be understood, however, that any number of nodes may be used. Additionally, nodes 18 and 20 may be located at a single location, such as the user's main residence. If desired, nodes may be located across more than one location. For example, one node may be in a user's main residence and another at the user's vacation house. In embodiments where user accounts are provided, nodes of an installation may be associated with more than one user account.

In some embodiments of the present invention, user node 18 may include a client device 22 that may be connected to communications network 16. In Internet-based approaches, such as in the embodiment shown in FIG. 1, client device 22 may be connected to the Internet via an Internet service provider (ISP) 23. Client device 22 may be any device suitable for communicating with remote site 14 via communications network 16. For example, client device 22 may be a computer, a personal digital assistant (PDA), a terminal, a set-top box, or any other suitable device that provides access to remote site 14 via communications network 16. Client device 22 may include, for example, an Internet browser application 26 that may be used to access web pages via communications network 16. In other suitable approaches, client device 22 may run a client application that provides locally generated displays propagated with a format obtained using any suitable client-server or peer-to-peer scheme.

Client device 22 may communicate with ISP 23 or directly with communications network 16 using any suitable communications link. For example, the link may include a telephone dial-up link, digital subscriber lines (DSL), a cable modem link (e.g., a data over cable service interface specification (DOCSIS)), a satellite link, a computer network link (e.g., Ethernet link, T1 line, etc.) or any other suitable communications link or combination of communications links.

Remote site 14 may include one or more servers. For example, remote site 14 may include web server 46 and database server 48. Database server 48 may maintain database 58. In other suitable approaches, such as non-Internet based approaches, remote site 14 may include an application server and any other suitable server or combination of servers.

Figure 2:
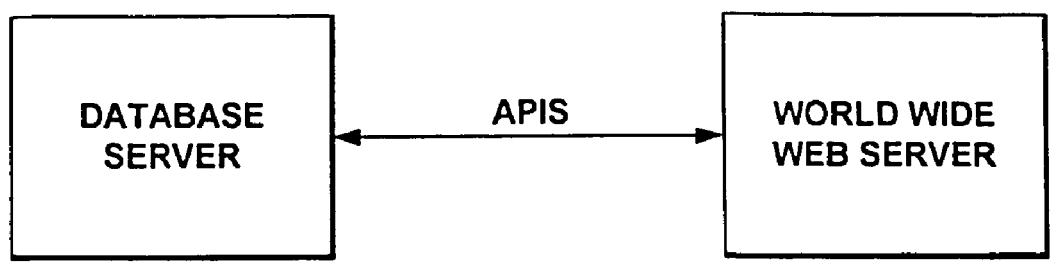
FIG. 2 is a diagram showing an illustrative relationship between the database and the web server of FIG. 1 in accordance with an embodiment of the present invention.

Generally, communications between database server 48 and web server 46 may be accomplished using API functions, as shown in FIG. 2. Web server 46 may call a particular API function that causes the database to be accessed. The API may then return a value (in accordance with the specification of the particular function) that is sent to web server 46. This is merely an illustrative way of allowing web server 46 to interact with database server 48. If desired, any other suitable way of allowing the web server to interact with the database may be used. Although the illustrated system uses APIs as an interface between database server 48 and web server 46, other suitable technologies may be used. For example, Perl scripts, CGI scripts, Cold Fusion, or any other suitable technologies, or combination thereof, may be used to interface database server 48 with web server 46.

In some suitable approaches, remote site 14 may provide displays or display definitions to client device 22. In the Internet-based approach of FIG. 1, for example, web server 46 may generate static and dynamic web pages from data supplied by database server 48. Web page 47 may be viewed by a user using Internet browser 26 running on client device 22.

Software applications that interface installation 12 with remote site 14 may be created using any suitable platform and/or software development tools. For example, Java 2 Enterprise Edition, Javabeans, component object model (COM) based technologies (e.g., ActiveX, object linking and embedding (OLE), etc.), JavaScript, Visual Basic, C, C++, scripting languages, or any combination of these or other suitable development tools may be used. In addition, any suitable combination of these or other suitable development tools may be used in preparing other software modules or applications for the various embodiments of the present invention.

Remote site 14 may function as the master controller of system 10. In addition, users may access system 10 via any computer, monitoring module, or remote user access device linked to communications network 16. Remote user access devices (such as remote user access device 17 in FIG. 1) may include, for example, personal digital assistants, cellular telephones, set-top boxes, personal computers, or any other suitable device a user may use to access remote site 14 via communications network 16.

Monitoring modules 28 may serve as an interface between remote site 14 and at least one connected device 32. Monitoring modules 28 may be any suitable hardware, software, or a combination thereof and may be included at any point within the system. For example, monitoring module 28 may be a software application running on client device 22 or a separate piece of hardware that may be connected to client device 22 (as shown at node 18) or partially implemented as software on client device 22 and a separate piece of hardware. In some embodiments, monitoring module 28 may be a stand-alone appliance (as shown at node 20) connected to communications network 16, operating separately and independently from client device 22. Each monitoring module 28 may be shipped with a model identification code, or with the capacity to generate such a code, that may serve to identify each particular monitoring module's model type.

One or more monitoring modules 28 may be installed at one or more locations. Monitoring modules 28 may be installed by the user (or any other suitable person) by, for example, connecting the modules to client device 22, and may communicate with remote site 14 over communications network 16. The connection between the monitoring module 28 and the client access device and between devices and the monitoring module may be in the form of a universal serial bus (USB) connection, parallel port connection, serial connection (e.g., RS-232), Firewire connection, any combination of these, or any other suitable type of connection. If desired, monitoring modules 28 may be given the capability (e.g., processing hardware, communications equipment, etc.) to communicate, via communications network 16, without the use of a client access device.

Monitoring modules 28 may link attached devices or appliances (e.g., sensors, cameras, microwaves, refrigerators, etc.) with remote site 14 via communications network 16. One or more monitoring modules 28 may provide data from attached devices and appliances to remote site 14 via communications network 16. The term "device," as defined herein, shall include any suitable device or appliance. At least one device 32 may be interfaced with and controlled by each monitoring module 28. Connections between monitoring module 28 and the various devices 32 may be hardwired or wireless (e.g., using Bluetooth technology).

Devices 32 may encompass any suitable device capable of being controlled or mediated by an external controller. Such devices may include, but are not limited to, a camera 34, a radio 36, a smoke or fire detector 38, a contact sensor 40, and a light switch 41. Although not illustrated, other suitable devices may include, for example, various audio input and output devices, infrared devices and sensors, various visual displays, washers/driers, microwave ovens, cooking ranges, car alarms, plant watering devices, sprinklers, thermostats, carbon monoxide sensors, humidity sensors, water emersion sensors, radon sensors, temperature sensors, audio sensors, radiation sensors, rain gauges, video cassette recorders, radio tuners, or any other suitable device and the like.

One or more notification devices, such as pager 43, may also be incorporated into the system. As illustrated in FIG. 1, pager 43 is communicating wirelessly with a wireless or cellular transmitter 44 associated with remote site 14. Other suitable notification devices include, for example, e-mail clients, wireless hand-held computers, wireless wearable computer units, automatic web notification via dynamic web content, telephone clients, voice mail clients, cellular telephones, instant messaging clients, and the like. Notification devices may receive notification of events within the system and indicate such events to the user.

System 10 provides users with opportunities to remotely control and monitor devices 32 using remote user access devices 17 via communications network 16. In the example of FIG. 1, users may control devices 32 that are interfaced with monitoring modules 28 at node 18 and devices 32 interfaced with monitoring module 28 at node 20. In practice, there may be a single node, or more nodes, depending on, for example, the user's equipment, number of sites, or other suitable parameters. In practice, any suitable system architecture and communications network 16 may be used to allow users, or anyone that users permit, to readily monitor and control monitoring modules 28 from any location using any suitable device that is capable of communicating with remote site 14 via communications network 16.

In another suitable approach, users may access installation 12 using remote user access devices 17 without the use of remote site 14. For example, remote user access devices 17 may be used to communicate with monitoring modules 28 of installation 12 via communication network 16 and ISP 23. If desired, two-way communications may be implemented using this approach. Remote user access device 17 may access installation 12 using, for example, special IP addresses assigned to a particular monitoring module, node, installation, or any other suitable element of the installation. The use of IP addresses is merely illustrative. Any other suitable addressing or other communications protocol may be used to allow access to an installation from a remote used access device.

Devices 32 may be programmed at the installation with respect to how they respond to certain events. Alternatively, devices 32 may be programmed from a remote location using remote user access device 17, for example. The programming may be stored in devices 32, monitoring modules 28, or at remote site 14.

Figure 3:
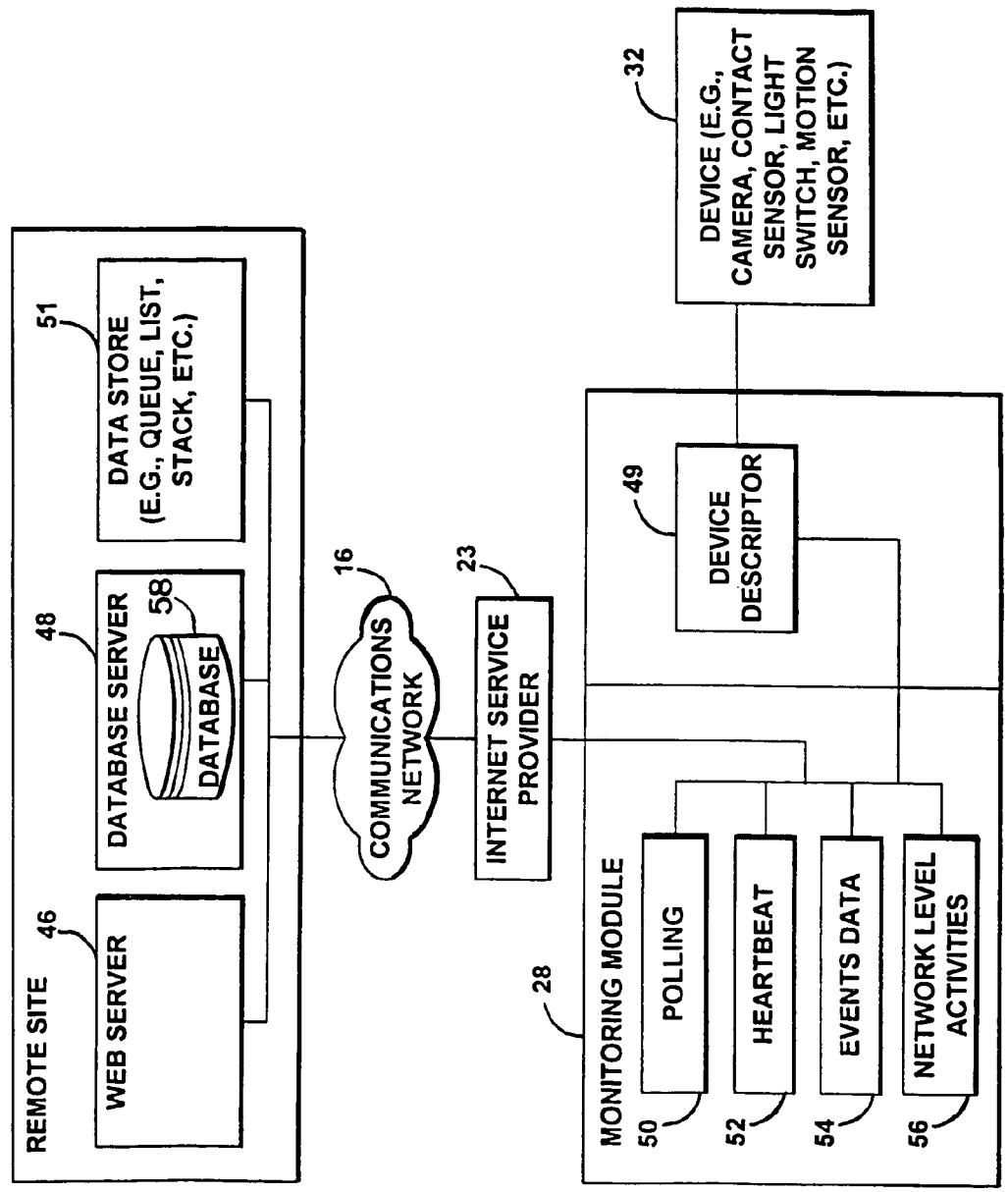
FIG. 3 is an illustrative block diagram of some of the components of the illustrative system of FIG. 1 in accordance with an embodiment of the present invention.

Referring now to FIG. 3, monitoring module 28 may serve, for example, as a common connection point for one or more devices 32 at an installation 12 and as the interface between devices 32 and remote site 14 via communications network 16. Monitoring module 28 may, for example, serve as a translation and brokering agent between remote site 14 and devices 32.

In some embodiments, monitoring module 28 may be software made up of multiple dynamically loaded objects, or device descriptors 49, that may allow remote site 14 to interface with the devices 32. The dynamically loaded device descriptors 49 may act as device drivers for devices 32, translating, in both directions, monitoring, command, and control data (i.e., via monitoring module 28) exchanged between devices 32 and remote site 14 via communications network 16. Each device descriptor 49 may also translate the signals received from monitoring module 28 into the specific electrical signals that are required to communicate with (both input and output) and control its associated device 32. Device descriptor 49 may be provided for each specific device 32 when, for example, different devices 32 have different interfaces and require specific sets of electrical signals for their monitor and control.

Device descriptors 49 may include, for example, a manufacturer identification, product identification, and driver version number to allow a device to be referenced correctly. Once a new device 32 has been detected and is to be integrated into the system, monitoring module 28 may reference, download, and run the appropriate drivers for the new device.

After loading a new descriptor 49, monitoring module 28 may communicate with remote site 14 to determine whether the new device 32 has been previously catalogued. Monitoring module 28 may, for example, determine if a general description and a default state of device 32 exists at the remote site. When a device 32 has been catalogued, then, for example, the default state and general parameters of device 32 may be stored at remote site 14. A catalogued device 32 may eliminate the need to resend the general parameters and default state and monitoring module 28 may just communicate the instance-specific parameters. When a device 32 is not already catalogued, device 32 may communicate its default state and static parameters to monitoring module 28 that may, in turn, communicate the default state and static parameters to remote site 14. The communication from monitoring module 28 to remote site 14 may be done using name/value pairs using, for example, the normal HTTP post method discussed hereinbefore. For example, a template document may be a static parameter of device 32. Template documents are discussed in detail below.

In some embodiments, monitoring module 28 may persist the state of devices 32. This may be done, for example, to allow the real-time states of devices 32 to be stored, to communicate to remote site 14, or to allow for easy recovery from a system crash. The stored state of devices 32 may be used, for example, to maintain a synchronized relationship between an installation 12 and remote site 14. In some embodiments, remote site 14 and installation 12 may use polling and heartbeat mechanisms in order to synchronize state information between remote site 14 and installation 12.

Polling may refer to a process whereby monitoring module 28 obtains commands from remote site 14. The commands may reside, for example, in command queue 51. Commands may be accumulated at command queue 51 as a result of any suitable action by the user, by remote site 14, or by both. For example, a user may use a remote user access device to issue a command or a request to remote site 14 to cause a change in state of one of devices 32 (e.g., to turn a lamp on). Remote site 14 may post the change in state command to a command queue 51.

Monitoring module 28 may communicate a request for pending commands to remote site 14. This request may, for example, be communicated periodically as part of the polling process. In response to the monitoring module's request, remote site 14 may provide one or more pending commands from command queue 51, and may notify monitoring module 28 of the number of remaining pending commands in command queue 51. Monitoring module 28 may then communicate another request for pending commands. Remote site 14 may return more of the pending commands from command queue 51. This process may continue until command queue 51 at remote site 14 is empty.

Remote site 14 may provide commands to monitoring module 28 using any suitable algorithm. For example, remote site 14 may return commands using first-come, first-serve, round robin, first-in, first-out, weighted prioritization, or any other suitable algorithm. Remote site 14 may also proactively inform monitoring module 28 that commands are waiting in queue 51. Monitoring module 28 may then poll remote site 14 and retrieve commands from remote site 14 until the queue is empty.

Commands issued on remote site 14 can be generated by the user while the user is logged on to web page 47 provided by remote site 14. If a user is not logged onto web page 47 then fewer commands are being issued and thus the need to poll remote site 14 is low. Therefore, the frequency of polls may decrease. In addition, a poll frequency setting process may monitor the usage patterns of a user and set a suitable frequency based on the user's pattern of command generation. For example, the user may not often be logged on to web page 47 at remote site 14 from the hours of 2 AM to 7 AM because the user is sleeping. Therefore, the smart frequency setting process may detect this pattern and automatically decrease the poll frequency at 2 AM and increase it again at 7 AM.

Whereas polling process 50 is used by remote site 14 to effect state changes in devices 32 via monitoring module 28, monitoring module 28 may use heartbeat process 52 to update device state information at remote site 14. A heartbeat may be a periodic communication from monitoring module 28 to remote site 14 containing updated state information for devices 32 associated with monitoring module 28. In one suitable heartbeat process 52, monitoring module 28 may send a communication to remote site 14 in response to a change in state of a device 32, a synchronization of a device 32 with remote site 14, a triggered alert event, or in response to any other suitable event. In such a heartbeat operation 52, all data intended to be transmitted to remote site 14 may be transmitted to remote site 14 via communications network 16. Remote site 14 may transmit an acknowledgment of receipt and successful processing of the data back to monitoring module 28.

Remote site 14 may direct monitoring module 28 to make changes in its own state by, for example, posting commands to data store 51. For example, remote site 14 may post commands that set or modify the polling 50 or heartbeat 52 time intervals. Upon reaching the end of the current polling interval, monitoring module 28 may send a communication to remote site 14, requesting any queued commands. Monitoring module 28 may continue to poll, using any suitable communication scheme, until the queue of commands waiting for monitoring module 28 is empty. Each command received from the queue may be acted upon when the command is received and any associated state changes are effected. Remote site 14 may transmit an acknowledgment of receipt and successful processing of the data back to monitoring module 28.

If desired, remote site 14 may send unsolicited communications to monitoring module 28. Remote site 14 may send communications to, for example, set or update the heartbeat or polling time, or to cause monitoring module 28 to issue a command to update a component of a device. Remote site 14 may send unsolicited communications to monitoring module 28 for any other suitable purpose.

In addition to maintaining the polling and heartbeat operations and exchanging communications for events, data, and commands 54 with remote site 14, monitoring module 28 may manage network level activities 56. These activities may include, but are not limited to verifying passwords, dialing up an ISP, if necessary, periodically uploading accounting/billing information, and performing security measures. Any other suitable network level activities may be performed by monitoring module 28.

Monitoring modules may register themselves, devices, or installations with remote site 14. Illustrative systems and methods for auto-registering devices with remote sites are described, for example, in Rezvani et al. U.S. patent application Ser. No. 09/709,688, filed Nov. 10, 2000, which is hereby incorporated by reference herein in its entirety.

The following examples will illustrate how users may remotely control various devices. For example, contact sensor 40 of FIG. 1 may be associated with the front door (not shown) of a remote location associated with second node 20. Contact sensor 40 may be configured to trip whenever the front door is opened. Camera 34 may be positioned to view the front door location and may be programmed to take a digital picture whenever the sensor contact 40 is tripped. This picture may be transmitted over communications network 16 and stored in database server 48. When contact sensor 40 detects that the front door has been opened, an event notification or alarm trigger may be transmitted by monitoring module 28 to database server 48. Database server 48 may have been previously programmed to transmit a notification event to the user's pager, for example, via cellular transmitter 44. As the contact sensor is tripped, camera 34 may take a picture of the front door and may transmit that picture, via monitoring module 28 and communications network 16, to database server 48. The user, having been notified via pager 42, may now access the picture using web server 46 of remote site 14 via Internet browser 26. In this way, the user may determine who has entered the front door of his or her home.

As another example, system 10 may allow a user located at one node 18 to control a device at a second node 20. The user may contact web server 46 via, for example, Internet browser 26 of node 18 in order to access a database entry for light switch 41 of node 20. A virtual representation of the light switch 41 may be made available to the user by web server 46 and may be manipulated by the user to remotely change the state of light switch 41 and the connected lamp 42. For example, the system may allow the user to change the state of lamp 42 from being "off" to being "on" by, for example, manipulating the virtual light switch from web server 46 and a corresponding command would be placed in a queue of waiting commands on the server component.

Periodically, the controlling module or monitoring module 28 may poll remote site 14 looking for pending commands, such as the change state command of light switch 41. Thereafter, the command may be transmitted to monitoring module 28 that would instruct the light switch to change from the "off" state to the "on" state, thus turning on lamp 46. A feedback mechanism may be used to indicate to the remote site 14 whether the command was executed. For example, the change in state of lamp 46 may be viewed by an appropriately positioned camera, such as camera 34, which would be used to visually monitor the remote location 20 to determine whether the command had been completed successfully. If the command had not been successfully completed, then an error message may be communicated to the user, using for example, the means specified by the user's notification preferences or through any other suitable means of communicating information to the user.

Figure 4:
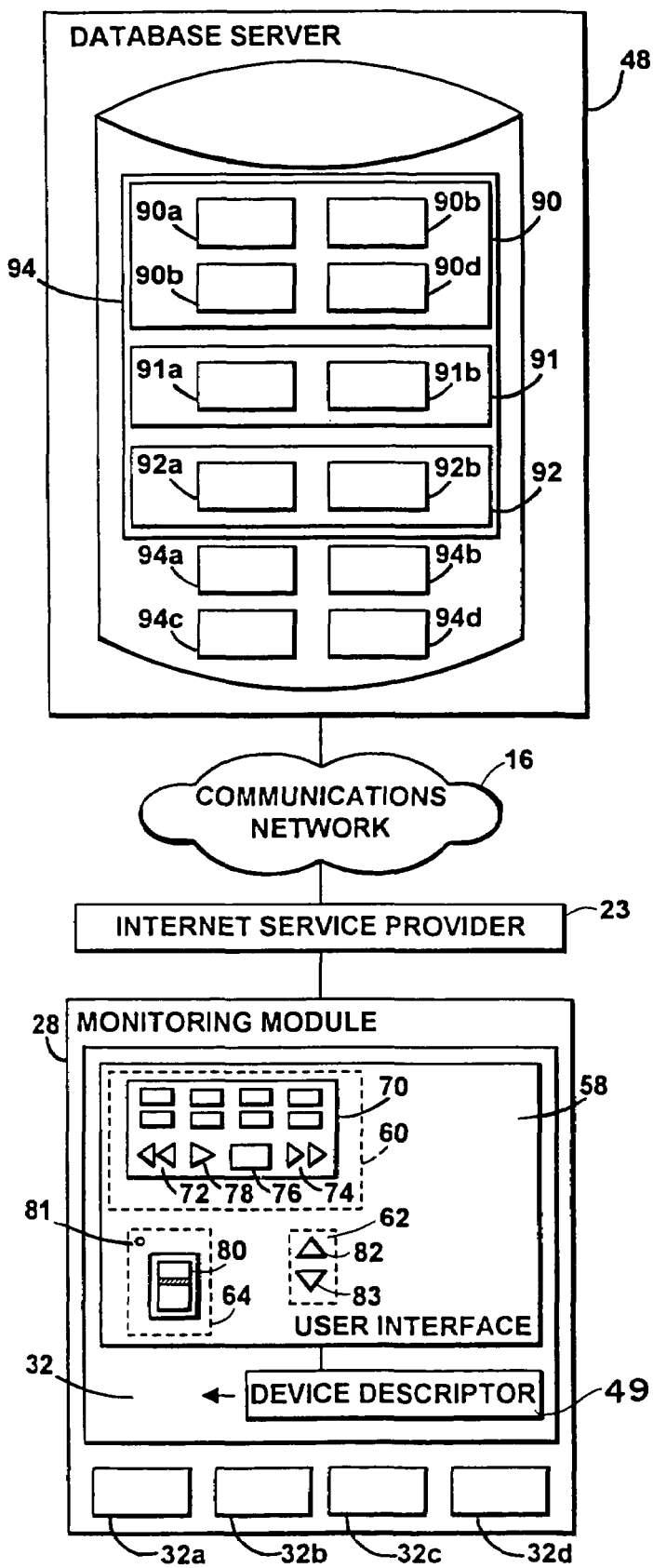
FIG. 4 is an illustrative block diagram of some of the components of the illustrative system of FIG. 1 in accordance with an embodiment of the present invention.

FIG. 4 further illustrates the relationship between devices, monitoring modules, and remote database server 48. FIG. 4 shows five devices, 32, 32a, 32b, 32c, 32d. In practice, there may be any number of devices with each installation. Each device may be interfaced to a monitoring module 28 via a device descriptor or driver 49 (for clarity, only one is shown). Each device may also be represented by a customizable user interface 58 that may be viewable on a remote user access device over communications network 16. Interfaces 58 may include virtual representations of the actual physical user interface of a device. In some embodiments, virtual representations may be stored on web server 46. Remote site 14 may use changes in the state of a device to change the virtual representations of the devices with which the changed states are associated.

A virtual representation of a device may be either a text-based, symbol-based, or image-based representation of an actual device 32. For example, and as discussed in greater detail below, if the device is a light switch, the corresponding virtual representation may include a text string that states "light on", or it may be an icon that may be either green or red. If the icon is green, that may denote that the actual light switch is in the "on" position. If the icon is red, that may denote that the light switch is in the "off" position. If, during a heartbeat operation, remote site 14 is informed that the state of the light switch changes from "on" to "off," then the virtual representation of the light switch may change from indicating an "on" state to an "off" state (i.e., the text string may state "light off" or the icon may change from being green to red.) In other embodiments, a virtual representation may be a combination of text and graphics.

Figure 5:
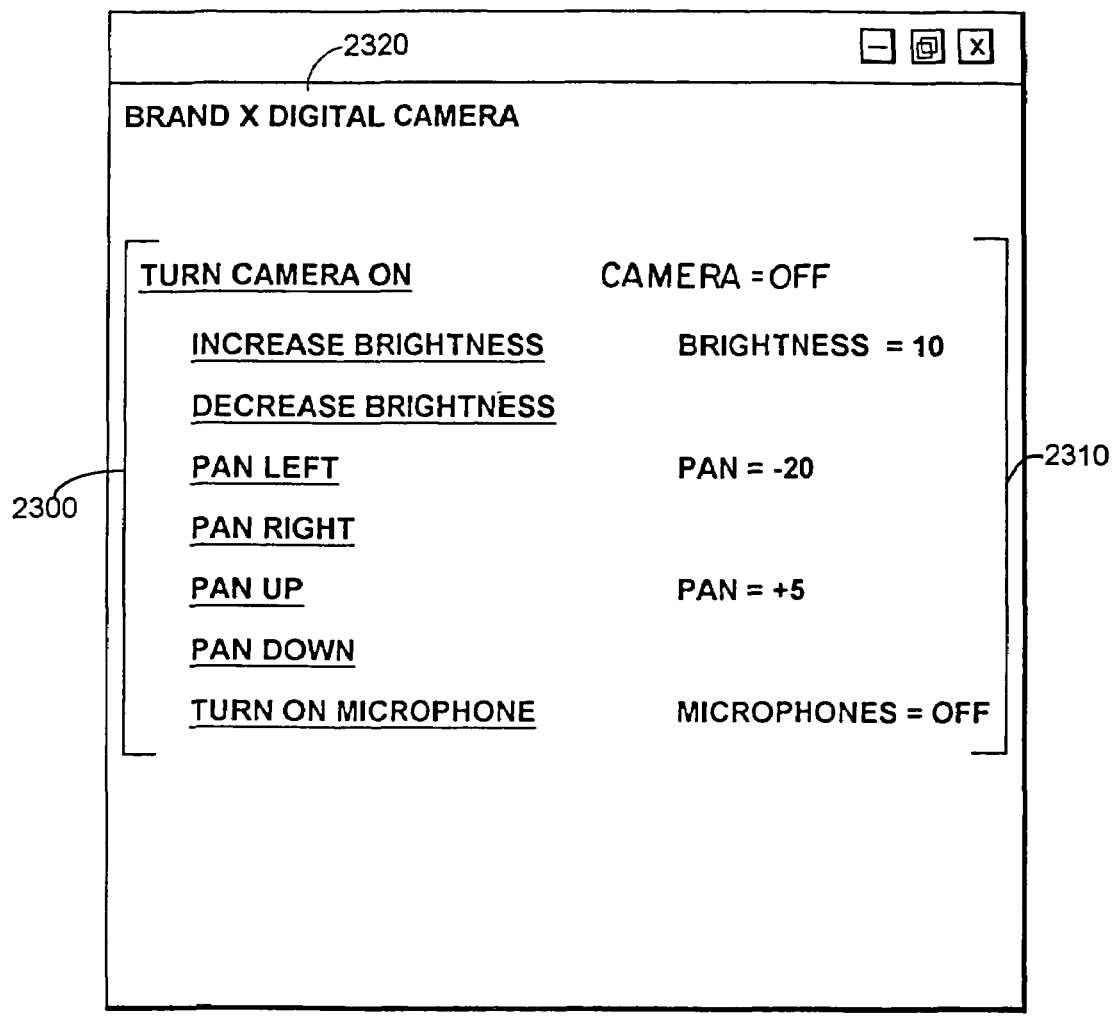
FIG. 5 shows an illustrative display screen depicting a virtual representation of a device using parameters, actions, and indicators, in accordance with an embodiment of the present invention.

In some embodiments, virtual representations may be textual representations of devices. An example of such a virtual representation is shown in FIG. 5. In this embodiment, the textual representations may include parameters, actions, and indicators. Parameters, actions, and indicators may be text strings that describe or represent various aspects of a remote device. Parameters may include any suitable information regarding a device. In some embodiments, parameters for a device may include the name, description, type, or the manufacturer of the device 32. For example, the device 32 may be a camera. The parameters 2320 for the camera may include the camera's name, description, type, and manufacturer name.

Actions may include any suitable action that a device 32 may take, or any suitable commands that may be transmitted to a device. In some embodiments, an action may be a selectable text string on a web page representing one of the various actions that a device may take. Actions 2300 for a camera may include, for example, "increase brightness," "decrease brightness," "pan left," "pan right," "turn on," "turn off," "turn on microphone," and "turn off microphone." A user may command the camera to turn up the brightness by selecting an appropriate link on a web page, which may read "turn up brightness". The command associated with a particular action link may be different from the description of the action link that is displayed on the generated web page. For example, an action link that is displayed as "turn on camera" may correspond to a command to check to see if the camera is on, and a conditional command to turn on the camera if it is off.

Indicators may provide information regarding particular feedback from a corresponding device 32 that may be displayed to a user. In general, indicators may include, for example, a name and a value. The name may indicate the label of the indicator to be displayed to a user and the value may indicate the state of that indicator. The indicators 2310 for a camera may include, for example, "pan position," "tilt position," "brightness level," "power status," "microphone on," "microphone level," and "last time motion sensor tripped".

Indicators may be periodically updated (e.g., during a heartbeat operation) to reflect the current status of a device. For example, after a user selects the command to turn up the brightness of a camera, an indicator may be updated to read "brightness=y," where y is the current brightness of the camera. As another example, an indicator may indicate the frame rate of a video camera. A name for such an indicator may be "Frame Rate".

In some embodiments, different actions and indicators may be selectively displayed to a user based on specific criteria. These preferences may be set automatically by the user during registration, which is discussed in more detail below. For example, a user may desire to have actions and indicators displayed in English. Accordingly, actions and indicators that are English may be chosen by database server 48, client device 22, or any other suitable retrieval script or program, and displayed. Similarly, if actions and indicators are to be displayed in another language, such as Spanish, then Spanish actions and indicators may be chosen by database server 48, client device 22, or any other suitable retrieval script or program, and displayed. In another embodiment, actions and indicators may be configured for display on a specific device. For example, one web page may be generated that may be appropriate for a computer using an Internet web browser, and another web page may be generated for a device with a much smaller display, such as a PDA or a WAP enabled cell phone.

Figure 6:
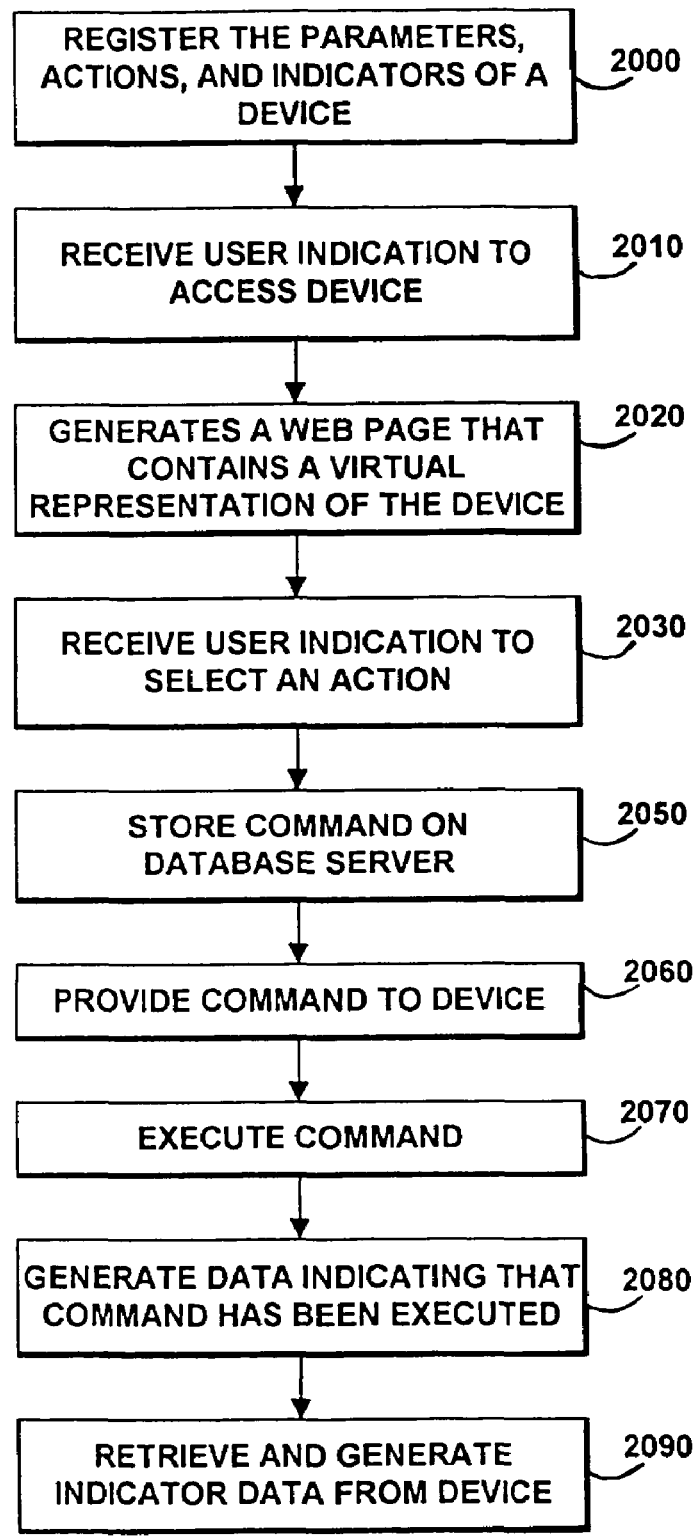
FIG. 6 is a flowchart of illustrative steps involved in the registration and display of a virtual representation of a device in accordance with an embodiment of the present invention.

FIG. 6 depicts a flowchart of general, illustrative steps involved in the use and display of a virtual representation of a device using parameters, actions and indicators in accordance with an embodiment of the present invention. During the registration process, a device 32 may register information regarding its parameters actions, and indicators (step 2000). Registration may include, for example, those steps of FIG. 14a as discussed below.

In response to a user indicating a desire to access the device 32 (step 2010), web server 46 may generate a web page 47 in step 2020 by retrieving the associated record for the device and user from database server 48. In some embodiments, the generated web page 47 may indicate actions associated with the device as links on a web page ("action links"). In this example, the web page 47 generated for the camera may include the action links "increase brightness," "decrease brightness," "pan left," "pan right," "turn off," "turn on," "turn on microphone," and "turn off microphone". The web page 47 generated for the camera may also include the indicators for that device. These indicators may be included on the web page as text strings on web page 47. For example, the web page 47 may include the text strings "pan position=a", "tilt position=b", "brightness level=c", "power status=d", "microphone on=e", "microphone level=f" and "last time motion sensor tripped=g", where a, b, c, d, e, f, and g are data corresponding to a particular indicator. The indicator may also be an audio indicator, such as, for example, a .wav file, or any other suitable audio indicator. Similarly, the indicator may be a static graphical representation, such as a .gif file, or any other suitable static, graphical representation.

In response to a user indicating a desire to select an action link in step 2030, a command (or commands) associated with the action link may be transmitted to the device (in the present example, a camera). In this example, the user may select "increase brightness". In response, a command may be stored on the database server 48 in step 2050. The command may then be provided to the device 32 in step 2060, which will in turn execute the command and increase its brightness level in step 2070. The camera device 32 may then generate data indicating that the camera brightness has been increased in step 2080. The data from the indicator may be provided to the database server 48 as, for example, discussed above. Subsequently, this data may be retrieved by web server 46 and used in generating an appropriate indicator on web page 37 in step 2090 as, for example, discussed above.

Figure 7:
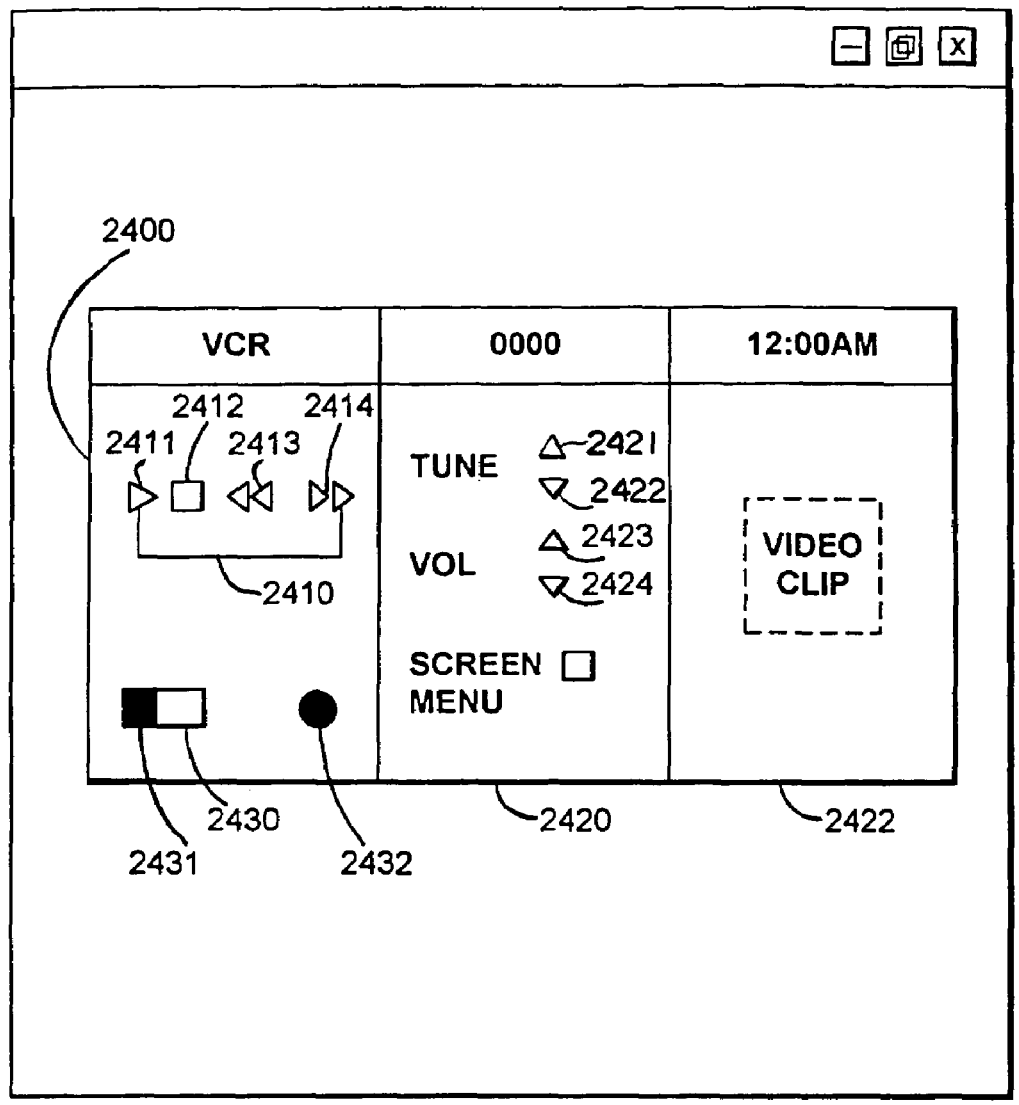
FIG. 7 shows an illustrative display screen depicting a virtual representation of a device using templates, resources, and components, in accordance with an embodiment of the present invention.

In other embodiments, virtual representations may be graphical. For some of these embodiments, the graphical representations may include resources and components. FIG. 7 shows an illustrative display screen depicting a virtual representation of a device using resources and components.

Resources may provide users with access to features specific to a device. A resource may include one or more components (e.g., resource 2400). A component (e.g., components 2410) may be an object that includes methods and data that may be used to generate and define the graphical representation of the component (a "display component"). The display component may correspond to a "physical" component on device 32 (a "member"). A virtual representation of a device may include only resources, only components, or any suitable combination thereof. In some embodiments, components may include actions, parameters or indicators.

Display components may represent a variety of different members. For example, display components may represent (or be displayed to a user as) toggle buttons, radio buttons, absolute sliders, proportional sliders, edit fields, labels, images, streaming video, streaming audio, time fields, date fields, edit fields, labels, images, video clips, multiselect list, N-directional components, N-state buttons, N-state selectors (where N may be any suitable integer), trees, tables, graphs, charts, drawing pads, banners, or any other suitable display components.

Display components may act as status indicators. Display components may allow users to toggle settings or otherwise control devices 32. For example toggle buttons may indicate, for example, whether a device is in the "on" position or in the "off" position. Toggle buttons may allow users to change the state of a device, by, for example, turning a device on or off. Sliders may indicate the percentage complete of a particular process a device may be performing (e.g., baking a cake), and may allow users to change the state of a device (e.g., changing oven temperature). Edit fields may allow users to change textual representations of suitable elements (e.g., naming a television show to be recorded by the show's name). Video, audio, images, or any other suitable media-based components may indicate what the devices are sensing (e.g., images may be sensed by cameras, streaming video may be sensed by camcorders, audio clips may be sensed by audio recorders, etc.). Date and time fields may indicate what date and time a VCR is set to start recording. Date and time fields may allow users to set the date and time a VCR may start recording. Multiselect lists may indicate all sound sensors that are detecting noise in the house. Multiselect lists may also be used, for example, to select some of a number of available sensors to turn on.

In order to display the current state of a device, a remote client access device may be provided with appropriate information by a monitoring module for propagation into the user interface. For example, referring back to FIG. 3, the state of a light switch, volume of a speaker, or the actual video from a video camera may be provided by monitoring module 28 to client access device 22 or remote site 14 and indicated in web page 47.

Moreover, users that access a virtual representation of a device may make any suitable changes to the individual components (e.g., that correspond to state changes of the corresponding device) and those changes may be communicated to monitoring module 28. In some embodiments, the actual state of components may not be altered in database 58 when the changes are issued by users through, for example, browser 26. Rather, upon monitoring module 28 receiving state changes via, for example, packaged commands from queue 51, the commands may be delivered to an appropriate device descriptor 49. Device descriptor 49 may be responsible for communicating a command to remote site 14 for the purpose of updating database 58 with the respective state changes. The communication from device descriptor 49 may confirm the acceptance of the state changes. Changes in display components of a device's virtual representation may signal that a corresponding change is or has been performed in physical device 32.

Generally, resources or components may also include data or instructions representing the actions the resources or components may take, and how the resources or components may indicate the status of their corresponding member on device 32, and parameters of the member. For example, resource 2400 includes a display component 2410 that includes a series of pushbuttons 2411, 2412, 2413, 2414 which a user may use to activate the VCR's play, stop, reverse and fast forward, respectively. Resource 2420 may include pushbuttons 2421, 2422, 2423, and 2424 that a user may use, respectively, to activate up channel and down channel functions and to increase or lower the volume functions of the VCR. The power resource 2430 may include a toggle switch component 2431 that users may use to activate the VCR's power on and power off commands, and an LED indicator 2432 that may indicate the power condition of the VCR.

Resources and components may also have additional functionality that is not indicated by the physical interface of a given device. For example, a VCR may not have a button programming regularly scheduled media. This functionality, however, may be represented in the virtual interface using resources or components. Furthermore, display resources or components that represent device 32 may be incorporated to correspond to functionality that may not exist on the device. A button represented on the user interface through web page 47 that "locks" down a VCR, for example, may not correspond to a physical button on the VCR. The unavailable functionality on the VCR may allow the user to remotely access his or her VCR to lock it for the purpose of protection. Such a resource or component may be created in, for example, the device driver in monitoring module 28.

In some embodiments, templates may be used in creating virtual representations. A template is a layout document that can specify how resources and components may be arranged and displayed to a user in a display (e.g., user's web page 47 at remote site 14). Templates may exist at any suitable point in a given system as either static or dynamic documents. For example, templates may be downloaded from a remote server at registration. The ability to download templates from a remote server (e.g., a device manufacturer's server) may permit a third party (e.g., the manufacturer) to incorporate desired changes and/or new aspects in the device template. Templates incorporating static parameters may exist as a static parameter inside the hardware of device 32, as a static parameter within the driver and setup during registration procedures, may be hard-coded into a remote server, or may be communicated through monitoring module 28 via the device drivers and stored on the user's account. Templates may also be stored on any suitable media and downloaded at registration. For example, a template may be stored on a floppy disk, optical disk, or any other suitable media, and downloaded at registration. Any other suitable approach may be used.

A markup language, such as SGML, HTML or any other suitable markup language, may be used to generate a template. A template may specify how resources and components may be arranged through the use of place holders. A place holder may take the form of <component id=XX>, where "id" may be used to designate a particular component. The place holder may be followed with code (e.g., HTML code, JavaScript, etc.) that may include state information of the particular resource or component, or any other suitable information. These place holders may indicate where in a virtual representation a resource or component should appear.

Figure 8:
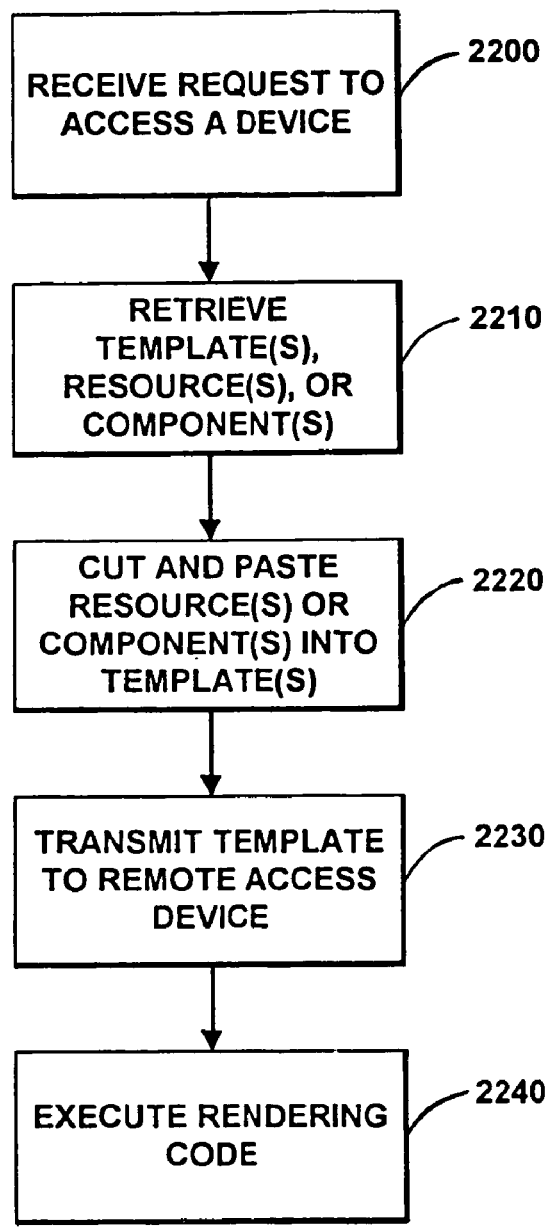
FIG. 8 is a flowchart of illustrative steps involved in generating a virtual display using a template document in accordance with an embodiment of the present invention.

FIG. 8 depicts illustrative steps involved in one embodiment for generating a virtual representation using a template document. In step 2200, a request or other indication is received from remote user access device 17 or client access device 22 that a user wishes to access (i.e., monitor or control) a device 32. In response to this request, one or more templates, resources, or components may be retrieved by database server 48, client access device 22, or any suitable retrieval program or script using any suitable approach (step 2210). For example, database server 48, client device 22 or any other suitable retrieval program or script may retrieve appropriate templates, resources, or components from its own storage or from another database server (e.g., from the Internet), using URLs or other identifiers of the templates, resources, or components. In some embodiments, devices 32 may be programmed with the templates and components or resources and may provide them to client access device 22 or database server 48.

Once the resources and components are retrieved, the functions necessary to display the display resources and components may be cut and pasted into the template (step 2220). In one embodiment, this may be accomplished by using the retrieved resources or components as inputs into a representation assembly function. The assembly function may then assemble appropriate code that can generate a display resource or component (i.e., "rendering code") into the template. For example, the assembly function may replace the place holders of the template with rendering code. In another embodiment, the rendering code may be part of the resource or component. Database server 48, client access device 22, or any other suitable retrieval script or program may retrieve the rendering code from the resource or component, and cut and paste it into the proper place of the template document. The rendering code may be written in any suitable language, such as C, C++, Java, or Perl.

Once the rendering code has been cut and pasted, the template may be transmitted to a remote access device (step 2230). In step 2240, the rendering code may be executed, and a display resource or component generated, thus rendering the desired virtual representation. A browser (or any other suitable interface) may be loaded to display the virtual representation of the device.

The rendering code may be executed to generate a display resource or component in any suitable manner. In one approach, the rendering code may be executed as a Java function on the remote user access device. This approach may be suitable when, for example, the use of a cross-platform interpreter (such as Java) is desirable or available. In another approach, the rendering code may be a self-contained executable program encapsulated in the template that, when called, may render the appropriate resource or component. This approach may be suitable in instances where, for example, a cross-platform interpreter is either undesirable or unavailable.

In some embodiments, several templates may be available for a device, each including place holders for different resources or components. Each template may be appropriate for different circumstances. The database server 48, client access device 22, or any another retrieval program or script may select an appropriate template, depending on the circumstances. For example, if a virtual representation is to be displayed in English, a template may be chosen by database server 48, client device 22, or any suitable retrieval program or script that includes placeholders for resources and components that have English text. Similarly, if the virtual representation is to be displayed in another language, such as Spanish, then a template may be chosen that includes placeholders for resources and components that have Spanish text.

In some embodiments, different templates for a particular device may be selected depending on where the virtual representation is being displayed. For example, a template may be selected for a computer using a web browser, while another template may be selected for a device with a much smaller display, such as a PDA, or a WAP enabled cell phone.

Figure 9:
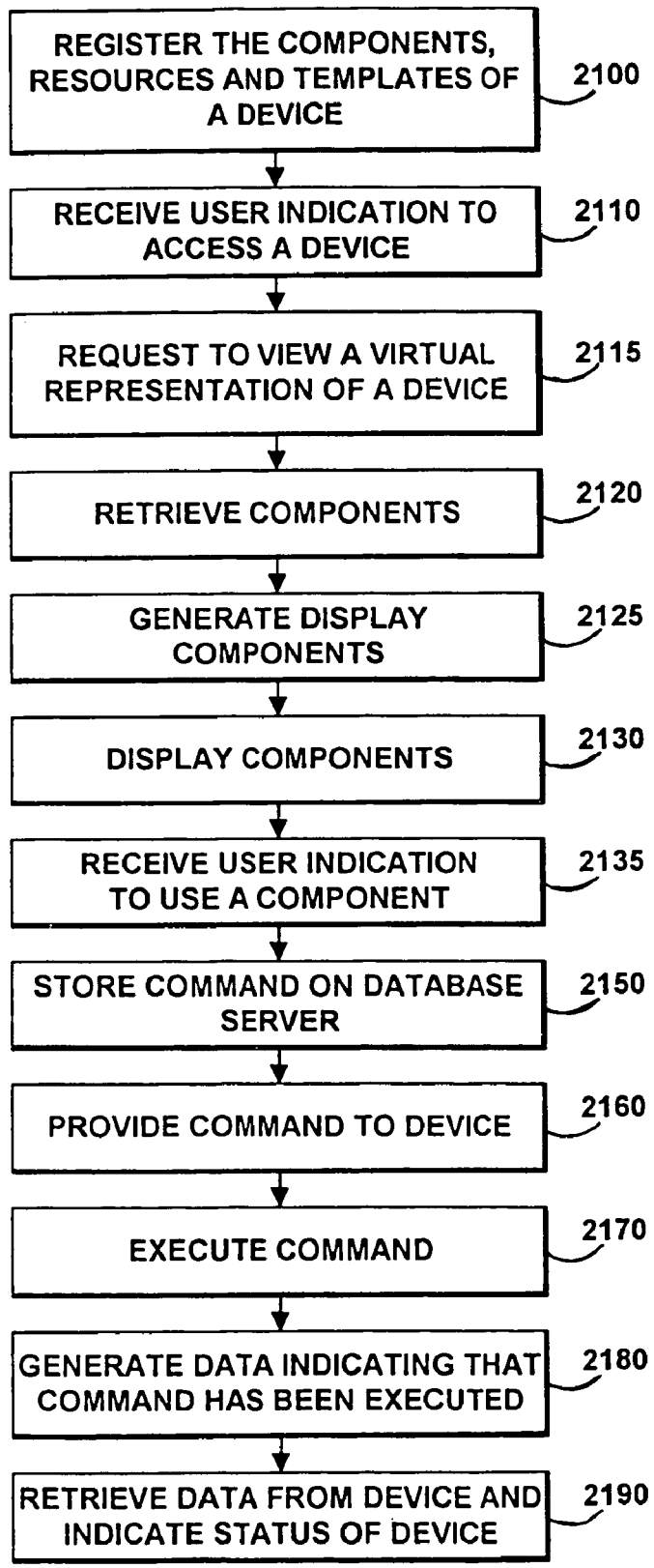
FIG. 9 is a flowchart of illustrative steps involved in the registration and display of a virtual representation of a device in accordance with an embodiment of the present invention.

FIG. 9 depicts a flowchart of general, illustrative steps involved in the use and display of a virtual device using components, resources, and templates in accordance with an embodiment of the present invention.

Information that may be registered regarding a resource or component may include general information or specific information, or any other suitable information. General information may include, for example, an identification label for the component, whether the component is editable (i.e., whether it may be manipulated by the user), or whether the component is active. Specific information may be device specific. For example, the device may be a light. The light device may include a component that is a slider, which may control brightness level, for example. Specific information pertaining to the slider that may be registered by the device 32 may include the high range of the slider, the low range of the slider, the increment that the slider should move when dragged (e.g., in increments of 1, 10, etc.), or the number of marks telling the user where the slider is positioned. Devices may also register other data or instructions representing the actions a component may take, and how the component may indicate the status of its corresponding member on device 32, and parameters of the member. As another example, a device 32 may be a camera. The camera device may include a directional component for controlling the pan and tilt of the camera lens, a first slider component for controlling recording volume, a second slider component for controlling the tilt of the camera, and a button component for turning the camera's power on and off.

Returning now to FIG. 9, in step 2100, the components, resources, and templates associated with a device may be registered in database 48 during the registration of the device 32. Registration may include, for example, those steps as discussed below in FIG. 14b. A device may be capable of registering information about itself. Accordingly, in step 2100, the device may register information regarding its components, templates, and resources. In some embodiments the processes and protocols used to register components may be different than the processes and protocols used for the registration of parameters, actions, and indicators.

In this example, camera device 32 may register general information for each component. The camera device may also register specific information for each component. By way of example, this may include the minimum value of the horizontal pan; the maximum value of the horizontal pan; the minimum value for the vertical pan; the maximum value for the vertical pan; the horizontal increment that the pan component should move when selected; the vertical increment that the component should move when selected; the normal, or "home" value of the horizontal pan; and the normal or "home" value of the vertical pan. Special information for the first and second sliders may include orientation (e.g., horizontal or vertical), the maximum range of the slider, the minimum range of the slider, the increment that the slider should move when selected by a user, a label for the minimum value; and a label for the maximum value. Specification information for the button component may include a state label to indicate the state of the button. A style value may also be registered as part of the special information for a component. The style value may indicate which style of component to display, if multiple varieties are available. Such styles may be pre-defined, user-configurable, or any combination of the two.

In response to a user indicating a desire to view the virtual representation of the device 32 in step 2110, a request may be made to web server 46 to view a virtual representation of the device 32 in step 2115. Upon receiving such a request, web server 46 may retrieve the components of the device 32 registered by the device 32 with database server 48 in step 2120. The data retrieved by device 32 may also include a template document that was registered by the device 32. The template document may be used to generate a web page displaying the resources and components in the format described by the template document.

Upon receiving the component data, the display components may be generated in step 2125. Once the display components have been generated, the display components may be displayed on web page 47 in the appropriate layout in step 2130, as determined by the template document. If a user indicates a desire to use a component in step 2135 (e.g., turn on a power button or decrease the brightness of a light), an appropriate command (or commands) associated with the desired command may be provided to the device. For example, if the device is a camera and a user desires to increase the brightness, the user may select the appropriate component (e.g., a slider) and execute the appropriate action (e.g., moving the slider by, for example, selecting it with a user input device (e.g., a mouse), and moving the slider in increasing increments). In response, the command may be stored on the database server 48 in step 2150. The command may then be provided to camera device 32 in step 2160. This may be accomplished by, for example, packaging the changed resource or component as a command or other communication.

When a user remotely controls a device 32, the commands may be entered into, for example, queue 51 of FIG. 3. In some embodiments, queue 51 may be, for example, an advanced queue that operates as specialized memory and a separate dequeue process may manage retrieving commands from the queue in a non-first-in-first-out (non-FIFO) process for different devices, but in a FIFO process for commands for the same device. In some embodiments, multiple queues may be used for different devices, different users, or using any other suitable approach. Web page 47 (or other display) may indicate that a state change has been submitted and in-the-process of being executed. Subsequently, the device may in turn execute the command and increase its brightness level in step 2170. The camera device 32 may then generate data indicating that the camera brightness has been increased in step 2180. Subsequently, this data may be retrieved by web server 46 in step 2190 and used to indicate that the brightness has been increased. This may be accomplished, for example, by indicating a percentage above the slider indicating the brightness of the camera, by sending an audible chime, by retaining the display of the slider as the user positioned it, or in any other suitable way.

In some embodiments, a registration process may be used to allow the registration of new users, monitoring modules, or available devices at remote site 14. Using information from the registration process, remote site 14 may provide the registered user with access to the functionalities of the registered monitoring module and registered devices. Users may access the functionalities of the modules and devices via communications network 16.

In some embodiments of the present invention, users may be required to create or open an account before installations, monitoring modules, devices, parameters, actions, and indicators, components, virtual representations, or other elements of the system that are associated with a particular user or entity may be registered with remote site 14. Subsequent access to the registered installations may be granted only to the user account holder or to those that the user account holder has permitted access. For example, the user or users of installation 12 may open an account with remote site 14 by accessing web server 46 of remote site 14 via, for example, web browser 26. If desired, accounts may be opened using any other suitable approach, such as, for example, using a telephone, or mailing in a physical contract. Information provided for the purposes of opening an account with remote site 14 may be stored in database server 48.

Figure 10:
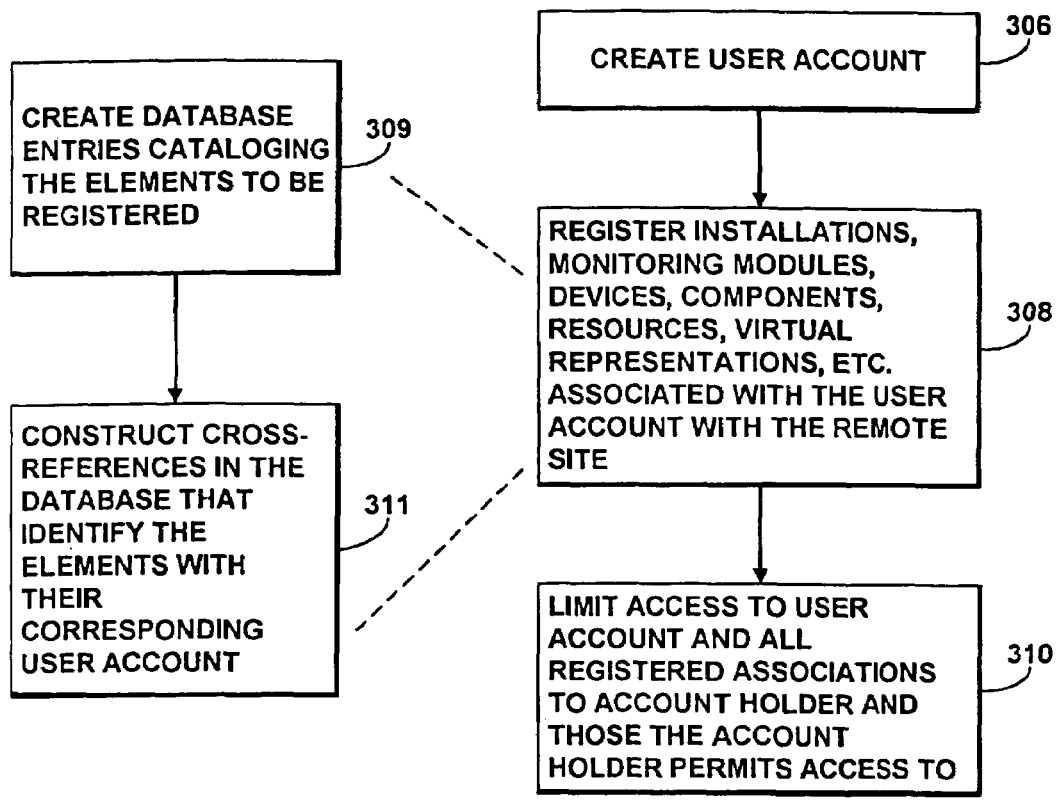
FIG. 10 is a flowchart of illustrative steps involved in associating an installation with a user account during a registration process in accordance with an embodiment of the present invention.

FIG. 10 is a flowchart of illustrative steps involved in associating registered installations (and the registered elements making up the registered installations) with a particular user account. At step 306 a user account is created. Registration of the user's installations takes place at step 308. Step 308 may include steps 309 and 311. At step 309, appropriate database entries may be made in database 58 that catalog the elements to be registered (which may effectively serve to register the elements at remote site 14). At step 311, remote site 14 associates the registered elements with their corresponding user account. This may be done using any suitable cross-referencing technique. For example, in a relational database, a separate table may list all installations in one field and the corresponding user accounts in another field. Another table may list all installations in one field (that may act as a key field to the first table) and all associated elements in another field. This is merely an illustrative relational database structure for cross-referencing installations and their elements with corresponding user accounts. Any other suitable database construct may be used.

Once the registration process is completed, the user account holder and those entities that the user account holder permits access to, may access the registered installations at step 310.

Monitoring modules 28 may also register with remote site 14. Information regarding monitoring modules 28, such as model identification, attached devices, etc. may also be stored in database server 48. Once a monitoring module is registered, it may register its attached devices with remote site 14. Information associated with devices, such as device names, may be stored in database server 48 and made available to the user. Each device 32 may communicate with monitoring modules 28 and export its customized interface to database server 48. If the interface is not customized, a default interface may be used.

The registration process of some embodiments of the present invention may require user interaction locally, remotely, or both. For example, the system may prompt users to enter registration information on a web site that is resident on web server 46. The system may, for example, require users to set or adjust system settings using set-up software running locally on user access device 22. The set-up information may subsequently be communicated to remote site 14. Any suitable combination of local and remote registration processes may also be used.

Figure 11:
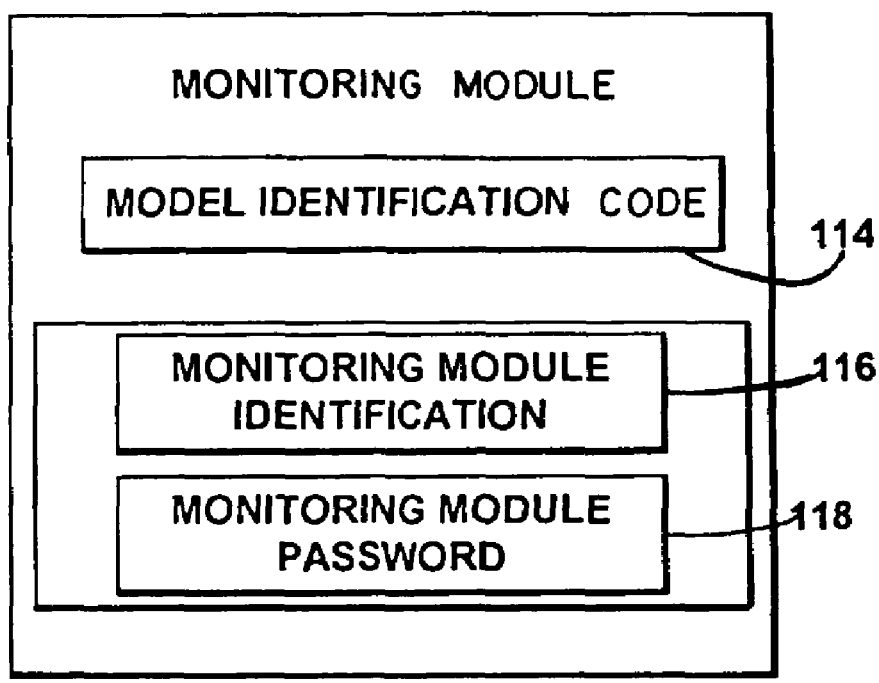
FIG. 11 is a block diagram of an illustrative identification information display screen that may be generated by a monitoring module in accordance with an embodiment of the present invention.

In some embodiments, the monitoring module may generate a globally unique monitoring module identification and a monitoring module password during the registration process. These are illustrated in FIG. 11. Every monitoring module 28 may have a model identification code, identifying the particular model of the monitoring module. During the registration procedure, or at any other suitable time, the monitoring module may generate a monitoring module identification 116 and a monitoring module password 118. If desired, the monitoring module identification 116 and a monitoring module password 118 may be predetermined and stored in memory in the monitoring module during the manufacturing process. The monitoring module identification may be unique to each particular monitoring module in the whole set of existing monitoring modules. This is merely an illustrative embodiment of the monitoring module, and any other suitable embodiment may be used.

Monitoring module 28 and remote site 14 may communicate using a communications protocol. The communications protocol between monitoring module 28 and remote site 14 (e.g., via communication network 16) may consist of a series of predefined messages, message parameters, and return codes. The registration protocol may be a subset of this communications protocol and may be specific to the registration process used to register monitoring modules and devices with remote site 14.

Registration protocol messages may be initiated by the monitoring module. The monitoring module may, for example, generate a transaction identification for each message. The transaction identification may be an identifier that is unique within a given time window. Registration protocol messages may include, or be accompanied by, the transaction identification, model identification code, monitoring module identification, and monitoring module password. The registration protocol message may include commands and any required command-specific parameters. If desired, any suitable part of the system other than the monitoring module may initiate the communication of registration protocol messages. For example, the user may manually initiate the registration protocol messages using, for example, client device 22.

Remote site 14 may process monitoring module registration messages and return confirmation messages to the monitoring module that initiated or generated the registration messages. The confirmation message may contain the original message's transaction identification, a version identification of the software being used at web server 46, database server 48, or both, and the name or other identification of the command to which the confirmation is responding. If desired, confirmation messages may include any other identification information or other suitable information instead of or in addition to those described.

Confirmation messages may also include an acknowledge character (ACK) to indicate remote site 14 processed the message correctly. When remote site 14 cannot process the message correctly, for whatever reason (e.g., checksum error, invalid command parameter, etc.), confirmation message may include a negative-acknowledge character (NAK) code. The confirmation message may also include an error message that may indicate the reason for the NAK code.

In one suitable approach, remote site 14 may have the ability to recognize certain errors, forms of errors, or both. Remote site 14 may also correct the recognized errors. Instead of returning a NAK code in this situation, remote site 14 may return an ACK code with a notification of the detected error and the fact that it was corrected. Alternatively, remote site 14 may only return an ACK code without the acknowledgment that an error was corrected. Any such suitable response may be used.

If desired, multiple registration protocol or other messages may be sent using only one communication. This may be accomplished using any suitable technique. For example, the messages may be bundled into an extensible markup language (XML) command schema. Remote site 14 may, likewise, respond to the bundled message communication in one XML confirmation schema. Alternatively, remote site 14 may provide individual responses for each command in the original communication.

Figure 12:
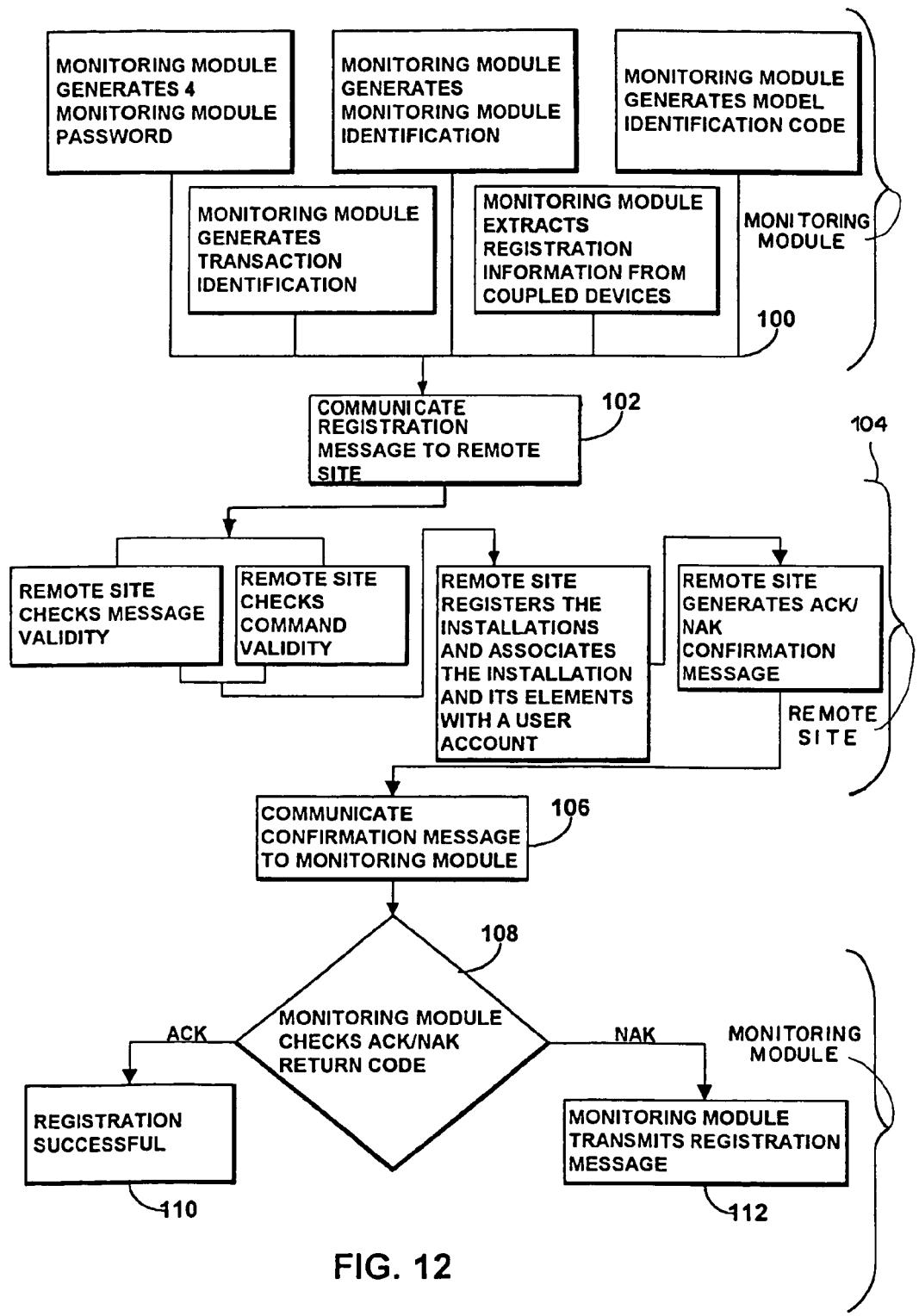
FIG. 12 is a flowchart of illustrative steps involved in the automatic registration of an installation in accordance with an embodiment of the present invention.

FIG. 12 is a flowchart of illustrative steps involved in the registration process in accordance with an embodiment of the present invention. It should be understood that the steps shown in FIG. 12 may be altered in any suitable way. For example, steps may be added, deleted, or performed in any suitable order.

FIG. 12 is merely an illustrative embodiment of the registration process. Any suitable modifications may be made in accordance with this embodiment of the present invention. In the first series of steps 100, the monitoring module may generate a monitoring module identification, a monitoring module password, a model identification code, and a transaction identification. Registration information from devices 32, coupled to the monitoring module may be extracted. These pieces of information may be included in a registration message that is communicated to remote site 14 by monitoring module 28 at step 102.

At step 104, remote site 14 may check the validity of registration messages, of command (or commands) included in the registration messages, or both. Checking message validity may include, for example, checking whether a message has a transaction identification that is unique within the agreed upon time window; checking whether a message includes a unique monitoring module identification and a monitoring module password; and checking whether a message includes a model identification code. If desired, any other suitable technique may be used in checking message validity. Checking message command validity may include, for example, determining whether a command is one that remote site 14 is able to recognize (i.e., is an actual predefined command); and whether a message includes the correct command parameters for the command used. If desired, any other suitable technique may be used in checking message command validity. If desired, remote site 14 may also check for command specific validity. This may involve, among other things, ensuring that any contingent devices have already been registered, checking to make sure a device that is to be registered has not already been registered, and any other suitable validity checks. FIG. 13a shows illustrative commands, corresponding command parameters, and corresponding command validity checks for the registration process. If desired, any other suitable commands may be used.

If there are no errors, remote site 14 may register the installation, including the monitoring module, devices, resources, components, virtual representations, and any other suitable elements of the installation. If desired, any of the elements may also be registered separately from other elements. Remote site 14 may also associate the registered elements with the corresponding user account. Registering monitoring modules 28 and devices 32 may include, for example, adding the identified monitoring module, devices, user, or any other suitable information contained in the registration message, to a database at remote site 14. Remote site 14 may then generate a confirmation message that includes, in the case of no errors, an ACK. When errors are encountered during the registration process, remote site 14 may return a NAK. At step 106, the confirmation message may be transmitted from remote site 14 to the monitoring module. At step 108, the monitoring module checks the confirmation message. If a NAK is found, then the monitoring module may retransmit the registration message at step 112. If an ACK is found then the registration is deemed to be successful at step 110.

Figure 13B:
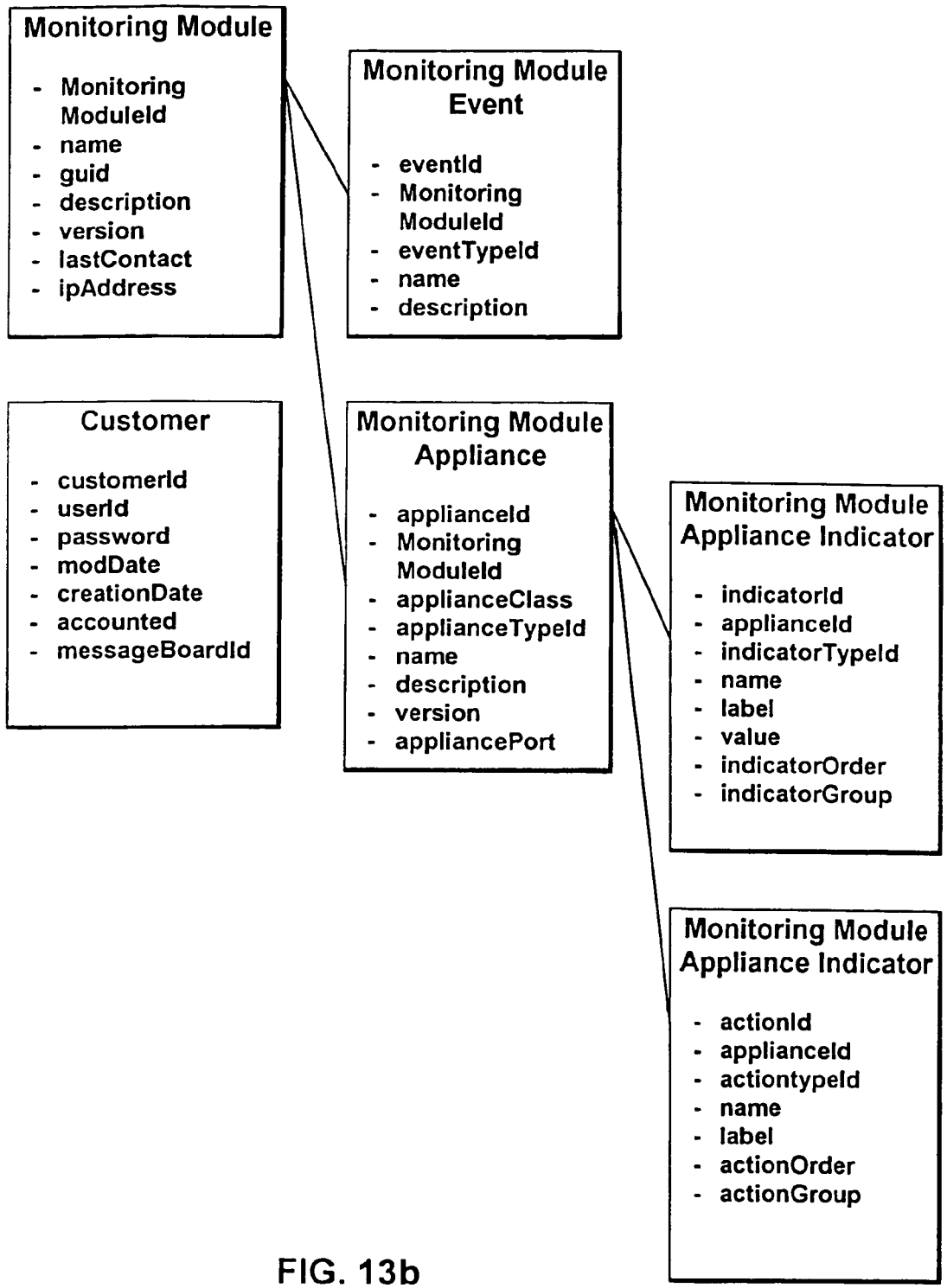
FIG. 13*b* is an illustrative database schema that may be used in accordance with embodiments of the present invention.

Information regarding registered monitoring modules and registered devices may be stored in the database. Remote site 14 may access the database to retrieve information about the registered monitoring module (or monitoring modules) and registered devices. The system may provide the user with the ability to set preferences for the registered devices, gather information from the registered devices, and control the registered devices. The database may allow for an efficient mechanism by which information about devices may be accessed and provided to the user. An illustrative database schema is shown in FIG. 13b. If desired, any other suitable schema may be used.

When a user registers with remote site 14, a number of table entries in the database may be created. The user's personal information, billing information, the monitoring module's unique monitoring module identification, the monitoring module password, and any other suitable data may be stored in the database. Entry of the data into the database may be facilitated by using an appropriate database application program interface (API), such as, for example, an API with a data parameter that may create a data cell and store the content of the data parameter in the data cell. Thus, only a single function call may be needed for entering a piece of data into the database. Once a new user is added to the database, the function may return a user identification code or number. This user identification may be used by the system to refer to the user rather than having to use the user's name.

The process for adding entries for monitoring modules and devices in the database may be similar to the process for adding entries for users. That is, using APIs, new table entries may be added in the database. When registering new monitoring modules and devices, only a single function may need to be called by web server 46 to create the appropriate table entries in database 58. The appropriate table entries may be created and the appropriate identification codes or numbers may be returned. If desired, any other suitable technique for adding entries for monitoring modules and devices in the database may be used.

When processing validity checks, web server 46 may query the database to determine whether certain entries are already in existence. For example, when registering a new device, a function may be called by web server 46 that returns a boolean value corresponding to whether or not the device already exists in the database. This querying process may be performed using suitable API's.

In another suitable embodiment of the present invention, the registration process may be layered with sub-registration processes for registering users, registering installations associated with their respective users, registering monitoring modules associated with their respective installations (and, in turn, associated with their respective users), registering devices associated with their respective monitoring modules, registering resources associated with their respective devices, registering components associated with their respective resources, and registering virtual representations which are made up of components to provide a virtual device.

The registration process for each of these layers may include registration information being sent from the monitoring module to the remote site, including suitable registration commands and parameters (e.g., addcomponent (Resource, monitoringModule, componentType, etc.)). Registration messages for the different layers may be generated using a markup language (e.g., HTML). For example, HTML form post commands with name/value pairs may be used in the registration message. When the registration message is communicated to the remote site, web server 46 may process the registration message by parsing the markup language code. Appropriate entries may be made into database 58 at remote site 14 to catalog the registered elements of an installation.

Each registered element may be assigned a suitable identification code by remote site 14 that may be used to identify at remote site 14 the element within a particular installation. In one suitable approach, monitoring module 28 may assign an identification to an element of installation 12 that is unique only to installation 12 or to monitoring module 28. The identification assigned by monitoring module 28 may or may not be made identical to the identification code assigned by remote site 14. In the approach where the identifications are different, the identification code assigned by remote site 14 may be mapped to the identification assigned by monitoring module 28 (e.g., using appropriate database constructs). When communicating with monitoring module 28 regarding a particular element, remote site 14 may look up the mapped identification assigned by monitoring module 28 and communicate using that identification. In the case where the remote site 14 and monitoring module 28 use the same identification, the identification assigned by remote site 14 may be returned to monitoring module 28. Monitoring module 28 may use the identification in subsequent communications with remote site 14 when referring to the element of installation 12 with which identification is associated.

For example, in some embodiments the parameters, actions, indicators, resources, components, templates, or a combination thereof, associated with a device 32 may be registered by the device 32 in database server 48 during the registration of the device 32. By allowing a device to auto-register such information, web server 46 may generate a predefined virtual representation from data supplied by database server 48, without knowledge of particular parameters, actions, indicators, resources, components or templates. More specifically, the database server 48 may include code that stores and retrieves parameters, actions, indicators, resources, components or templates associated with a device, without knowledge of such information. This may provide greater flexibility and manageability of the web server, since it need not be updated to include code to process newly developed devices with new parameters, actions, indicators, resources, components or templates. For example, if a new device is to be registered, such as a garage door opener, it may not be necessary to generate code for the database server 48 to process all of the parameters, actions, indicators, resources, components and templates for that device.

Figure 14A:
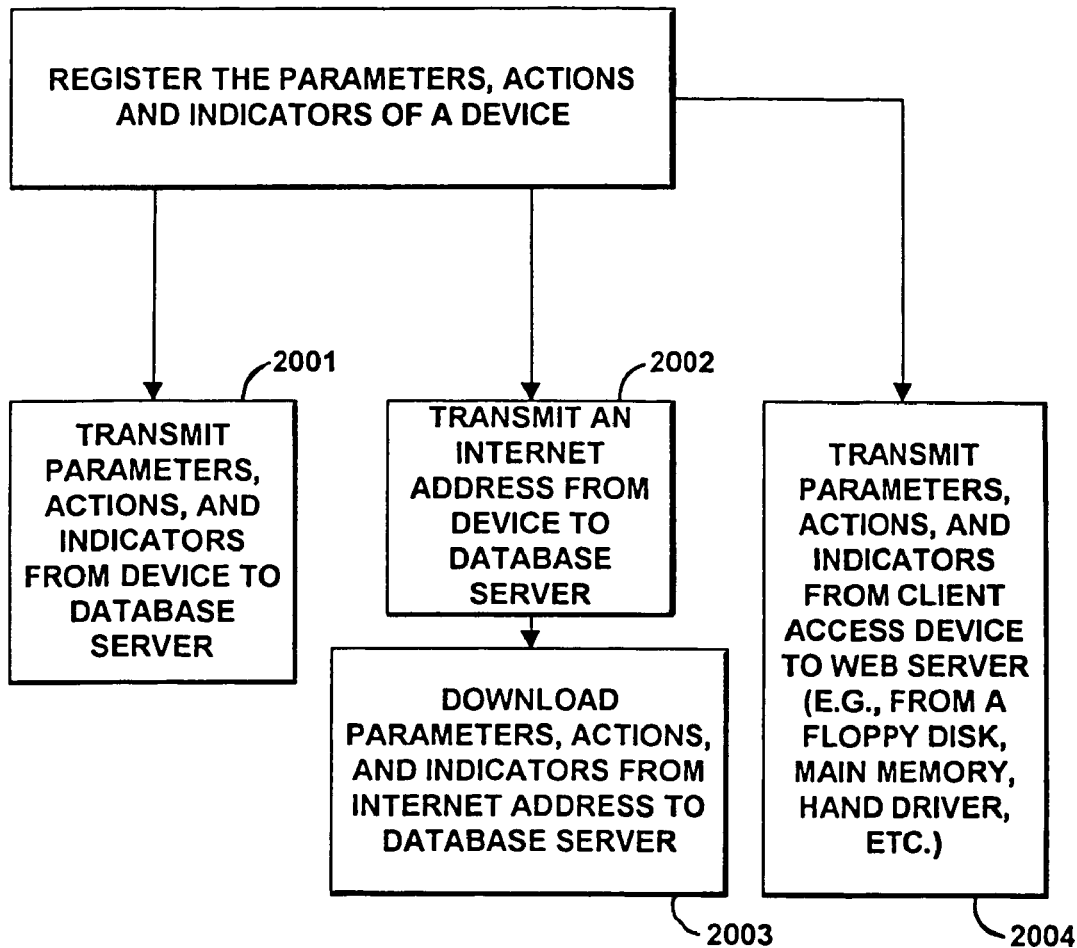
FIG. 14*a* is a flowchart of illustrative steps involved in the registration of parameters, actions, and indicators in accordance with an embodiment of the present invention.

In some embodiments, the parameters, actions, and indicators associated with a device may be included with registration information and registered with database server 48. FIG. 14a depicts illustrative steps involved in registering the parameters, actions, and indicators associated with a device. Parameters, actions, and indicators associated with a device may, for example, be stored on the device itself. Accordingly, in step 2001, these parameters, actions, and indicators may be transmitted from the device to a database server. Alternatively, an Internet address may be stored on the device where the parameters, actions, and indicators may be retrieved. Accordingly, in step 2002, this Internet address (or Internet addresses) may be transmitted from the device to a database server. In step 2003, the parameters, actions, and indicators located at that Internet address may be downloaded to the database server. Alternatively, parameters, actions, and indicators may be supplied by a client access device. The parameters, actions, and indicators may have been supplied to the client access device by any appropriate means. For example, the parameters, actions, and indicators may be downloaded by the client access device from a remote device, may be read from a floppy disk, a CD-ROM, DVD-ROM, or any other appropriate storage device. Accordingly, in step 2004, the parameters, actions, and indicators may be transmitted from the client access device to the database server.

Figure 14B:
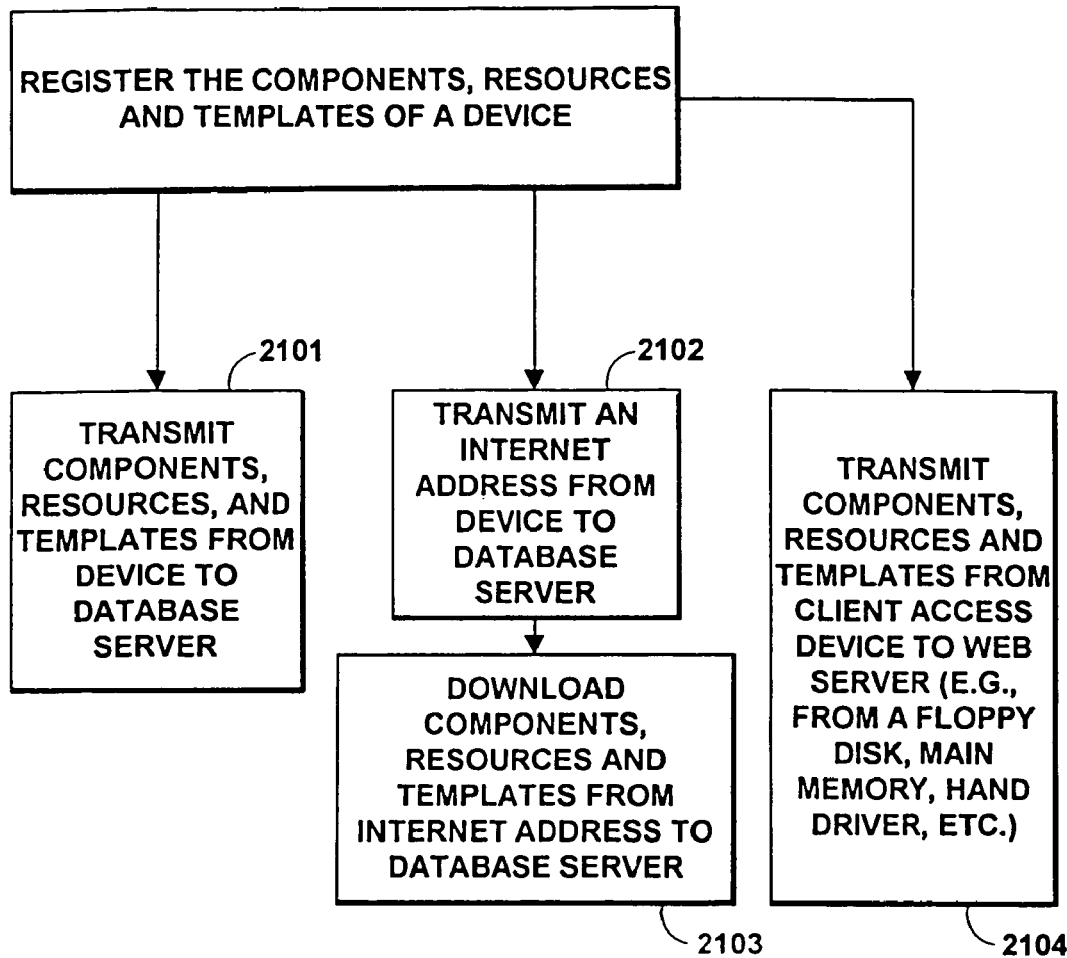
FIG. 14*b* is a flowchart of illustrative steps involved in the registration of components, resources, and templates in accordance with an embodiment of the present invention.

FIG. 14b shows illustrative steps that may be involved in registering the components, resources, and templates associated with a device. Components, resources, and templates associated with a device may, for example, be stored on the device itself. In step 2101, these components, resources, and templates may be transmitted from the device to a database server. Alternatively, an Internet address may be stored on the device where the components, resources, and templates may be retrieved. Accordingly, in step 2102, this Internet address (or Internet addresses) may be transmitted from the device to a database server. In step 2103, the components, resources, and templates located at that Internet address may be downloaded to the database server. Alternatively, the components, resources, and templates may have been supplied by a client access device. The components, resources, and templates may have been supplied to the client access device by any means desirable. For example, the components, resources, and templates may be downloaded by the client access device from a remote device, may be read from a floppy disk, a CD-ROM, DVD-ROM, or any other appropriate storage devices. Accordingly, in step 2104, the components, resources, and templates may be transmitted from the client access device to the database server. In some embodiments, a combination of these approaches may be used.

In some embodiments of the present invention, events may be registered at a remote site. An event may be specific to a particular device. For example, "FIRE!!!" may be a unique event to a fire alarm device, whereas "door motion sensor tripped" may be a unique event to a door motion detector device. Any such suitable events may be associated with their respective suitable devices.

In some embodiments of the present invention, as new devices are added to a registered monitoring module, the monitoring module may automatically (i.e., without any user interaction) detect the presence of the new devices and automatically notify remote site 14 of the presence of the new devices. Remote site 14 may, in turn, add the new devices to the database. In order to determine when and which new devices are added, the monitoring module may conduct object discovery on a continuous basis. If desired, the object discovery may be conducted on a periodic basis. Once new devices are found, the monitoring module may send a registration message to remote site 14.

In some embodiments of the present invention an installation 12 may be re-registered. For example, in the case where a system crash occurs at an installation 12, or if the hardware, software, or both is upgraded at the installation (or at the remote site), the installation may need to be re-registered. Re-registration may be necessary for any suitable reason. The process for re-registration may be substantially similar to the initial registration process for an installation, monitoring modules, resources, components, and virtual representations.

In one suitable approach, remote site 14, remote user access devices 17, or any other suitable remote elements of system 10 may access installation 12 or any of the elements of installation 12 using a special address (e.g., IP address) that is associated with a particular installation 12 or with a particular element of installation 12. The special address may be communicated from the corresponding installation or element of an installation during the registration process.

In other suitable embodiments, a device may be automatically detected. Automatic detection of devices may be implemented using any suitable software, hardware, or both that may allow devices coupled to a monitoring module to be automatically detected. The approach employed for implementing automatic detection may depend on whether there is one-way communications between devices 32 and monitoring module 28 (i.e., from devices 32 to monitoring module 28) or whether there is two-way communications.

Figure 15A:
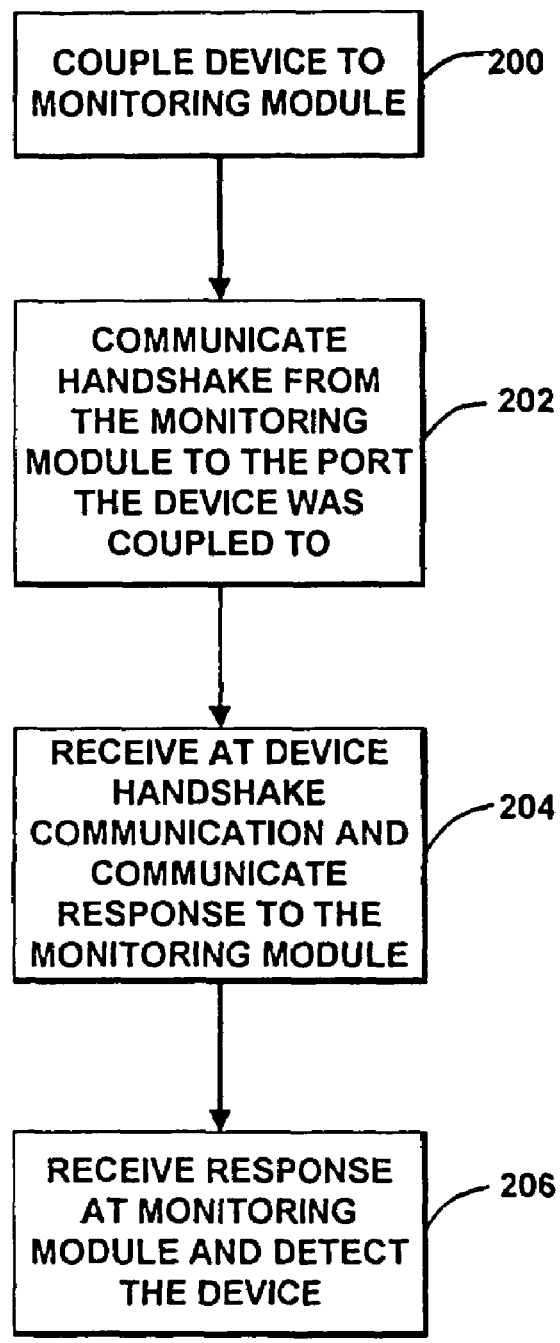
FIG. 15a is a flowchart of illustrative steps involved in using handshaking for automatic device detection in accordance with an embodiment of the present invention.

In one suitable approach monitoring modules may continuously, periodically, or in response to one or more particular events, attempt to handshake with devices. This is illustrated by FIG. 15*a*. The monitoring module may send a handshake message through all of its interface ports (e.g., USB, parallel, serial, IEEE 1394, infrared, proprietary, and any other suitable wired or wireless based port) in an attempt to reach all devices that may possibly be coupled to the monitoring module (step 200). The monitoring module may use any suitable algorithm in sending handshake communications to its interface ports. For example, the communications may be sent sequentially, using round robin, weighted fair queuing, or any other suitable algorithm. If a device is coupled to the monitoring module the handshake communication may be sent to the port to which the device was connected (step 202). At step 204, the device may respond to the handshake communication (e.g., with another handshake communication). If a response is received by the monitoring module, then at step 206, the device that communicated the response is detected by the monitoring module. The monitoring module may then request additional information from the detected device (e.g., to use in the registration process). If no response is received from a particular port, then a device is not detected at that port.

If devices are daisy-chained, the handshake may be passed on from one device to another in the chain. Responses from the daisy-chained devices may be returned from one device to the next until the responses reach the monitoring module.

Figure 15B:
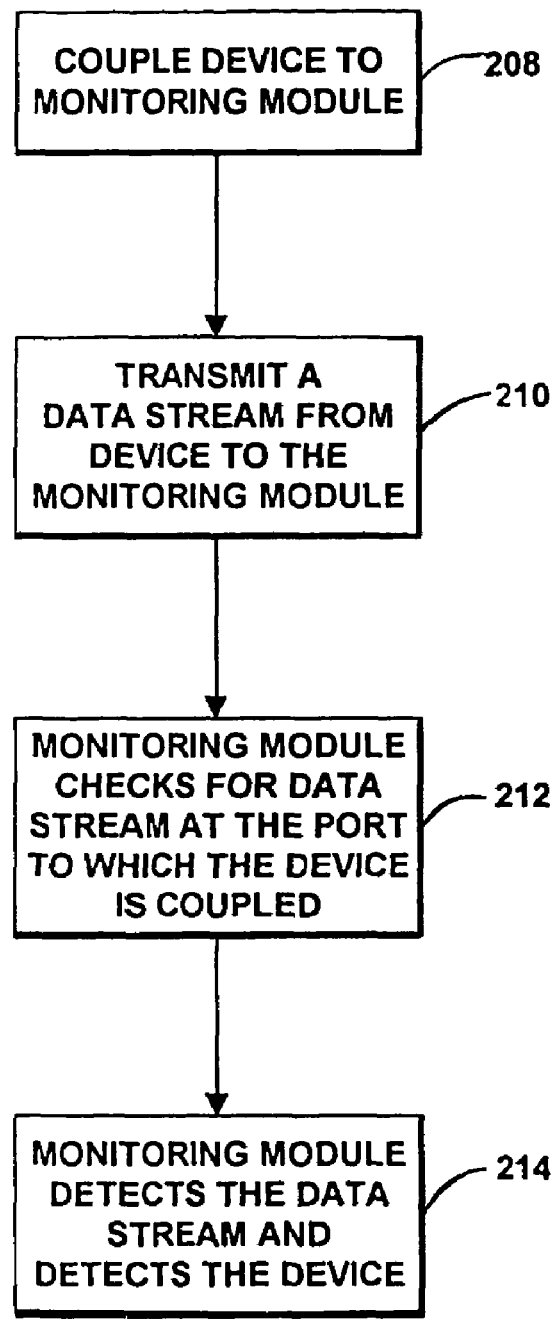
FIG. 15b is a flowchart of illustrative steps involved with detecting data streams for automatic device detection in accordance with an embodiment of the present invention.

The use of handshakes is merely an illustrative approach for the automatic detection of devices. Any other suitable approach may be used. For example, a monitoring module may check its ports to determine whether any data streams are coming into the ports. For example, in the case where the device is a video camera, a constant video feed may be communicated from the video camera to the monitoring module. If there is a data stream coming in, then the monitoring module may acknowledge that a device is coupled to that port. FIG. 15*b* illustrates this method of automatic detection of devices. At step 208 a device may be coupled to the monitoring module. The device may transmit a data stream at step 210. At step 212, the monitoring module may check ports for data streams and may detect a data stream (step 214) at the port corresponding to the device.

In another suitable approach, devices may be configured to periodically, continuously, or upon particular events (e.g., power-up, user pressing a button, or any other suitable event) send a message through their respective connection interfaces, identifying themselves. For example, each device may have a user interface such as a button that a user may need to interact with (e.g., pressing the button) in order for the device to be detected. For example, upon user interaction, the device may send a communication to its corresponding monitoring module. The communication may be any suitable communication that may allow the monitoring module to detect the device. In one suitable embodiment, the communication may include a serial number associated with the device. The serial number may be used by the monitoring module to identify the device in subsequent processes. If desired, this approach may be used with wireless devices (i.e., devices 32 that communicated with monitoring module 28 via a wireless interface such as Bluetooth), while wired devices may be detected using any other suitable method.

Any other suitable approach for the automatic detection of devices may be used. For example, the monitoring module may detect whether electrical current is flowing through device ports as a means of detecting devices (in the case of wired devices). In such an embodiment, the device may change the state of an interface element (e.g., a connection pin) between a high value and a low value depending on whether power is being sent through the port to the device. For example, if a video camera is coupled to the monitoring module, the video camera may be automatically powered by the current from the monitoring module. The flow of current may cause the value of a particular connection pin to change from low to high. The monitoring module may detect the high value of the particular connection pin, thus indicating the presence of a device.

In another suitable approach, the devices and monitoring modules may be configured according to hot-plugging standards (e.g., that make use of IEEE 1394, USB, PCMCIA, or any other interface that accords with hot-plugging standards). Any such suitable approach may be used.

In some embodiments, a detected device may communicate a unique string to the monitoring module. The unique string may be used by the monitoring module to detect the device or the unique string may be communicated subsequent to the detection of the device. The unique string may contain a uniform resource identifier (URI), such as, for example, a uniform resource locator (URL). The URI may provide a link to a downloadable object, such as, for example, a remote method invocation (RMI), a common object request broker architecture (CORBA) object, a distributed component object model (DCOM) object, a device driver/device descriptor, or any other suitable downloadable object. The downloadable object may be acquired by monitoring module 28 (using, for example, communication network 16). The downloadable object may be installed at monitoring module 28. The object may be executed and may take responsibility for running the corresponding device, registering parameters, registering events, registering components, or for performing any combination of these or any other suitable functions.

FIGS. 16-23 are illustrative displays that the system may provide to the user during the registration process. Although the displays shown in these figures are shown as web pages, it should be understood that the displays need not be limited to being displayed in a web browser or using an Internet-based or client-server based approach. For example, the displays may be generated by web server 46. FIG. 16 shows an illustrative service agreement display that the system may provide as one of the first screens in the registration procedure. When the user agrees to the terms of the service agreement, the system may then prompt the user for personal information as shown in FIG. 17. The system may, for example, prompt the user for a login identifier and password.

The system may also provide users with the opportunity to edit preferences for registered devices. For example, the system may provide users with opportunities to set up special notification preferences for particular devices. FIG. 18 shows an illustrative display. The display shows a listing of event descriptions and the corresponding notifications set up for each event description listing. The user may be given the ability to edit the notification action.

Figure 19:
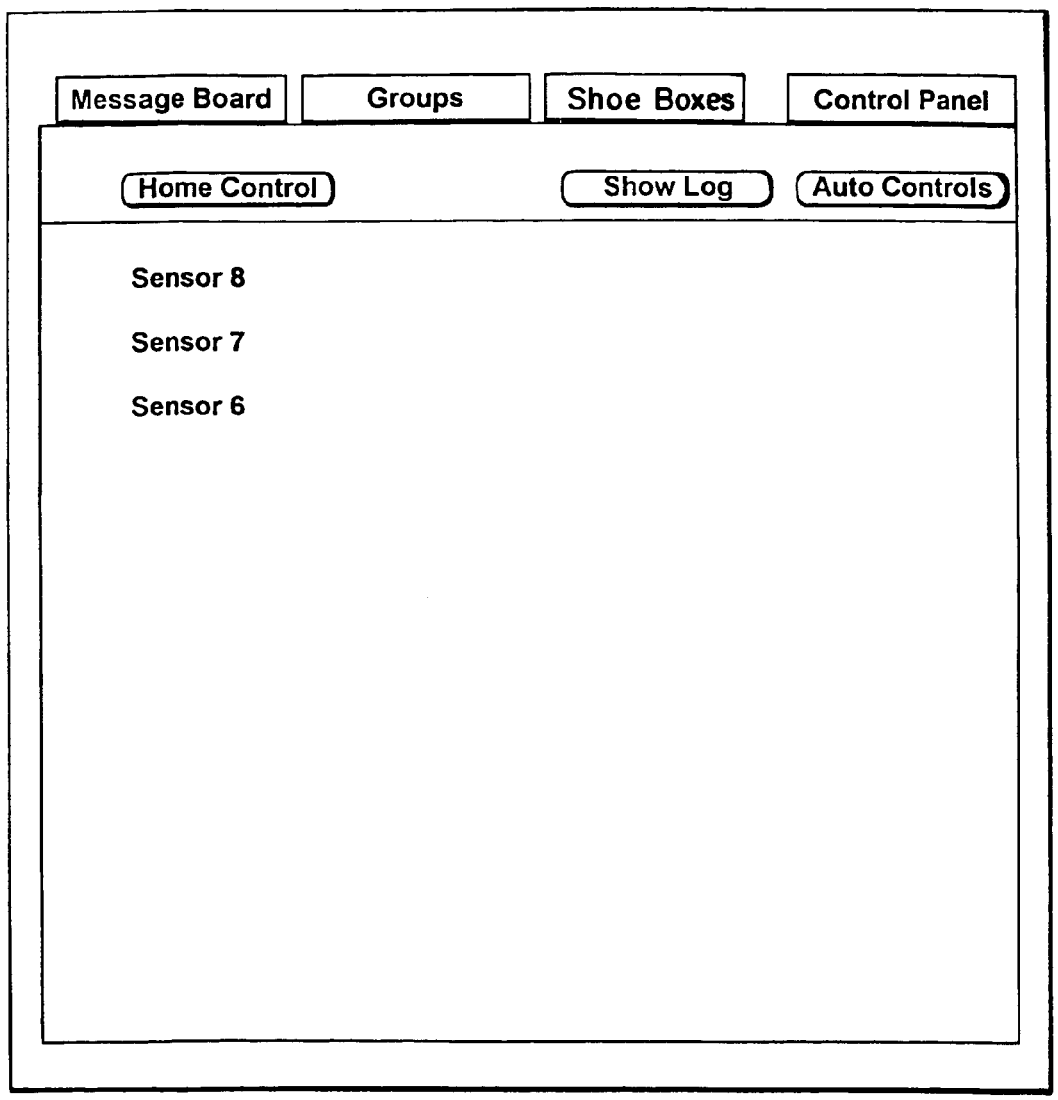
FIG. 19 shows an illustrative registration display screen for showing user-assigned names for particular devices in accordance with an embodiment of the present invention.
Figure 20:
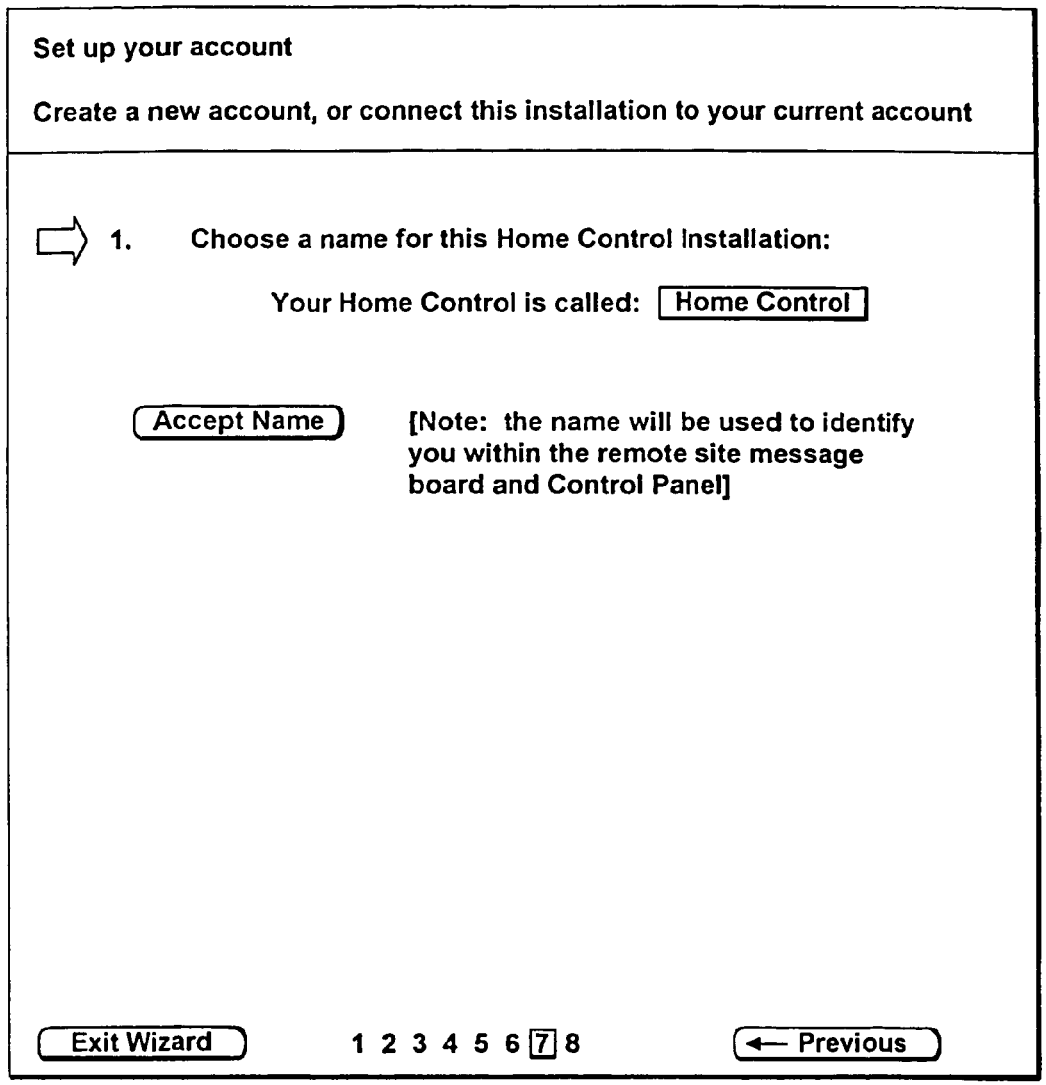
FIG. 20 shows an illustrative registration display screen for allowing a user to name an installation being registered in accordance with an embodiment of the present invention.

The system may provide the user with opportunities to set names or identifiers for monitoring modules and/or connected devices. FIG. 19 shows an illustrative display listing devices for a particular installation and the devices' corresponding names and/or descriptions. The system may provide the user with an opportunity to enter names for the monitoring module, the devices, or both, during the registration process. If desired, an entire installation may be given a name chosen by the user. FIG. 20 shows an illustrative display that prompts the user for an installation name.

If desired, the system may provide displays instructing users how to connect various devices and how to register them with remote site 14. FIG. 21 shows an illustrative display having instructions on how to connect a camera to the monitoring module in order for the camera to be automatically detected and registered with remote site 14.

Figure 22:
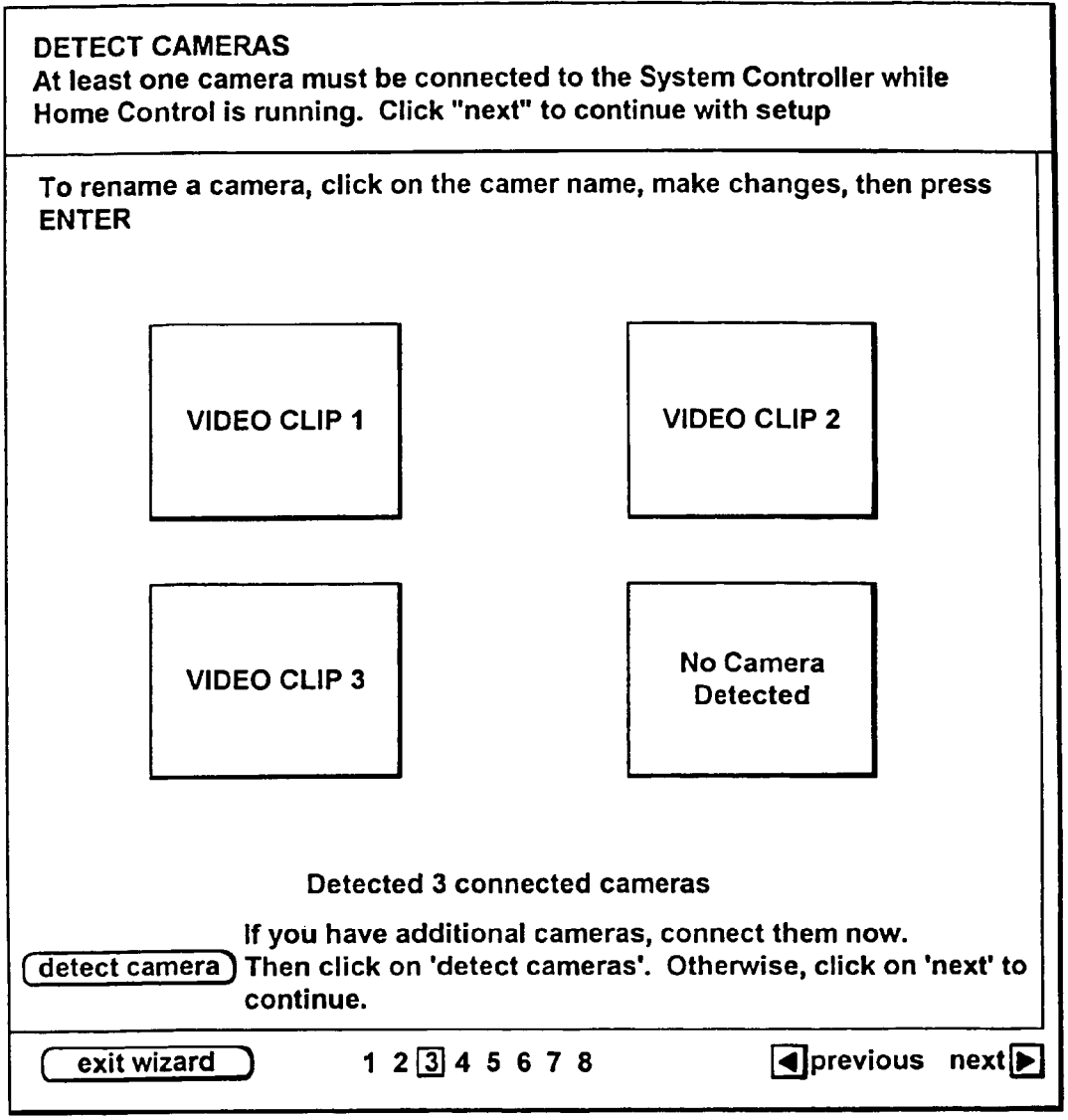
FIG. 22 shows an illustrative registration display screen for notifying the user of detected devices and to allow the user to rename a device in accordance with an embodiment of the present invention.

FIG. 22 shows an illustrative display showing which devices have been detected. The registration process may provide users with opportunities to set up or customize the detected devices in any suitable way. For example, the system may allow the user to rename any device, as in the illustrated example, to set parameters for detected devices (e.g., setting a digital camera's resolution, setting default settings for device, etc.), or to customize the devices in any other suitable way.

Other information that monitoring module 28 may supply to remote site 14 during the registration process may include information about the type of communications network 16 being used by the client access device to communicate with remote site 14. FIG. 23 is an illustrative display that may be displayed for the purpose of requesting this information. Any suitable information may be supplied to remote site 14 during the registration process, including, for example, information regarding client device 22, parameters for devices 32, and information regarding any particular software or hardware component of installation 12.

Thus, systems and methods for virtually representing devices at remote sites are provided. One skilled in the art will appreciate that the present invention can be practiced by other than the described embodiments, which are presented for purposes of illustration and not of limitation.

The invention claimed is:

1. A method for generating a virtual representation of one of a plurality of local devices for a remote user access device using a template document at a remote site comprising:
    associating each of the plurality of local devices with respective display components at the remote site;
    associating each of a plurality of user access device types with respective templates documents at the remote site, wherein each of the template documents:
        comprises a layout including placeholders specifying an arrangement of display components, and
        supports the plurality of local devices;
    receiving a request at the remote site to access a local device from a remote user access device;
    determining a remote user access device type of the remote user access device at the remote site;
    selecting a template document associated with the determined user access device type at the remote site;
    retrieving at least one display component for the requested local device at the remote site;
    inserting the at least one display component into a placeholder of the selected template document at the remote site;
    generating the virtual representation for the local device using the selected template document at the remote site; and
    transmitting the generated virtual representation for the local device from the remote site to the remote access device.

2. The method of claim 1 wherein the template document is retrieved from a remote database.

3. The method of claim 1 wherein the template document is retrieved from the local device.

4. The method of claim 1 wherein the template document is selected based on display language.

5. The method of claim 1 wherein the at least one display component corresponds to a component on the device.

6. The method of claim 1 wherein the at least one display component does not correspond to a component on the device.

7. A system for generating a virtual representation of one of a plurality of local devices for a remote user access device using a template document at a remote site comprising:
- means for associating each of the plurality of local devices with respective display components at the remote site;
- means for associating each of a plurality of user access device types with respective templates documents at the remote site, wherein each of the template documents:
  - comprises a layout including placeholders specifying an arrangement of display components, and
  - supports the plurality of local devices;
- means for receiving a request at the remote site to access a local device from a remote user access device;
- means for determining a remote user access device type of the remote user access device at the remote site;
- means for selecting a template document associated with the determined user access device type at the remote site;
- means for retrieving at least one display component for the requested local device at the remote site;
- means for inserting the at least one display component into a placeholder of the selected template document at the remote site;
- means for generating the virtual representation for the local device using the selected template document at the remote site; and
- means for transmitting the generated virtual representation for the local device from the remote site to the remote access device.

8. The system of claim 7 wherein the template document is retrieved from a remote database.

9. The system of claim 7 wherein the template document is retrieved from the local device.

10. The system of claim 7 wherein the template document is selected based on display language.

11. The system of claim 7 wherein the at least one display component corresponds to a component on the device.

12. The system of claim 7 wherein the at least one display component does not correspond to a component on the device.

13. A system for generating a virtual representation of one of a plurality of local devices for a remote user access device using a template document at a remote site comprising:
- a processor at the remote site programmed to:
  - associate each of the plurality of local devices with respective display components;
  - associate each of a plurality of user access device types with respective templates documents, wherein each of the template documents:
    - comprises a layout including placeholders specifying an arrangement of display components, and
    - supports the plurality of local devices;
  - determine a remote user access device type of the remote user access device;
  - select a template document associated with the determined user access device type;
  - retrieve at least one display component for the requested local device;
  - insert the at least one display component into a placeholder of the selected template document;
  - generate the virtual representation for the local device using the selected template document; and
  - transmit the generated virtual representation for the local device from the remote site to the remote access device.

14. The system of claim 13 wherein the template document is retrieved from a remote database.

15. The system of claim 13 wherein the template document is retrieved from the local device.

16. The system of claim 13 wherein the template document is selected based on display language.

17. The system of claim 13 wherein the at least one display component corresponds to a component on the device.

18. The system of claim 13 wherein the at least one display component does not correspond to a component on the device.

* * * * *